(12) United States Patent
Nishizawa et al.

(10) Patent No.: US 7,644,110 B2
(45) Date of Patent: Jan. 5, 2010

(54) STREAM DATA PROCESSING SYSTEM AND STREAM DATA PROCESSING METHOD

(75) Inventors: Itaru Nishizawa, Koganei (JP); Tsuneyuki Imaki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 253 days.

(21) Appl. No.: 11/359,540

(22) Filed: Feb. 23, 2006

(65) Prior Publication Data

US 2007/0022092 A1    Jan. 25, 2007

(30) Foreign Application Priority Data

Jul. 21, 2005    (JP) .............................. 2005-211483

(51) Int. Cl.
*G06F 17/30* (2006.01)

(52) U.S. Cl. .............................. 707/203; 707/10; 707/4; 707/5; 707/6; 709/202; 709/203; 709/219; 709/224; 709/225; 715/968

(58) Field of Classification Search ........................ None
See application file for complete search history.

(56) References Cited

U.S. PATENT DOCUMENTS 4,769,772 A * 9/1988 Dwyer .......................... 707/2
5,634,053 A * 5/1997 Noble et al. ................... 707/4
2004/0260685 A1 * 12/2004 Pfleiger et al. ................ 707/3

OTHER PUBLICATIONS

Continuous queries over data streams, Babu et al (Stanford University). Cost-Efficient Processing of Min?MAx queries over distributed sensors with uncertainty, Liu et al (SAC'05 Mar. 13-17, 2005, Santa Fe, NEw Mexico, USA).*
Issues in Data Stream Management, Golab et al (SIGMOD Record, vol. 32, No. 2, Jun. 2003) Streaming queries over streaming data, Chandrasekaran et al (Proceedings of the 28th VLDB COnference, Hong Kong, China 2002.*

(Continued)

*Primary Examiner*—Pierre M Vital
*Assistant Examiner*—Augustine Obisesan
(74) *Attorney, Agent, or Firm*—Stites & Harbison PLLC; Juan Carlos A. Marquez, Esq.

(57) ABSTRACT

A stream data processing system restrains the generation of communication traffic in the case of distributing loads by using a plurality of information processing devices. The global query is divided into a plurality of processes. At every divided process, a local query which includes the corresponding process is generated and each local query is set to a query processing device different from each other. In addition, the stream data is transmitted among a plurality of query processing devices in order so as to execute the local query in each query processing device. At this time, the entire stream data does not transmitted among the query processing devices in order. At least a part of the corresponding stream data is stored in a proxy device. When data received from an information processing device located in immediately before does not include the target data of the local query, the query processing device reads the corresponding data from the proxy device and executes the local query.

12 Claims, 15 Drawing Sheets

OTHER PUBLICATIONS

Adaptive filters for continuous queries over distributed data streams, Olston et al (SIGMOD 2003, Jun. 9-12, 2003 San Diego, CA) Models and ISsues in data stream system, Babcock et al (ACM Pods Jun. 3-6, 2002 Madison, Wisconsin, USA).*

Robust query processing through optimization, Marki et al (SIGMOD Jun. 13-18, 2004, Paris France).*

Models and Issues in Data Stream Systems, Babcock et al (ACM Pods Jun. 3-6, 2002).*

Continous query over data stream, Babu et al (SIGMOD, Sep. 2001).*

Continuous query processing of spatio-temporal data streams in PLACE, Mokbel et al, Department of Computer science and engineering, University of Minnesota, MN, USA. 2004.*

Rajeev Motwani et al., "Query Processing, Approximation, and Resource Management in a Data Stream Management System", Stanford University (2002), pp. 1-12 http://www-db.standord.edu/stream.

Rajeev Motwani et al., "Query Processing, Resource Management and Approximation in a Data Stream Management System", Stanford University, Proceedings of the 2003 CIDR Conference, 12 pages http://www-db.standord.edu/stream.

* cited by examiner

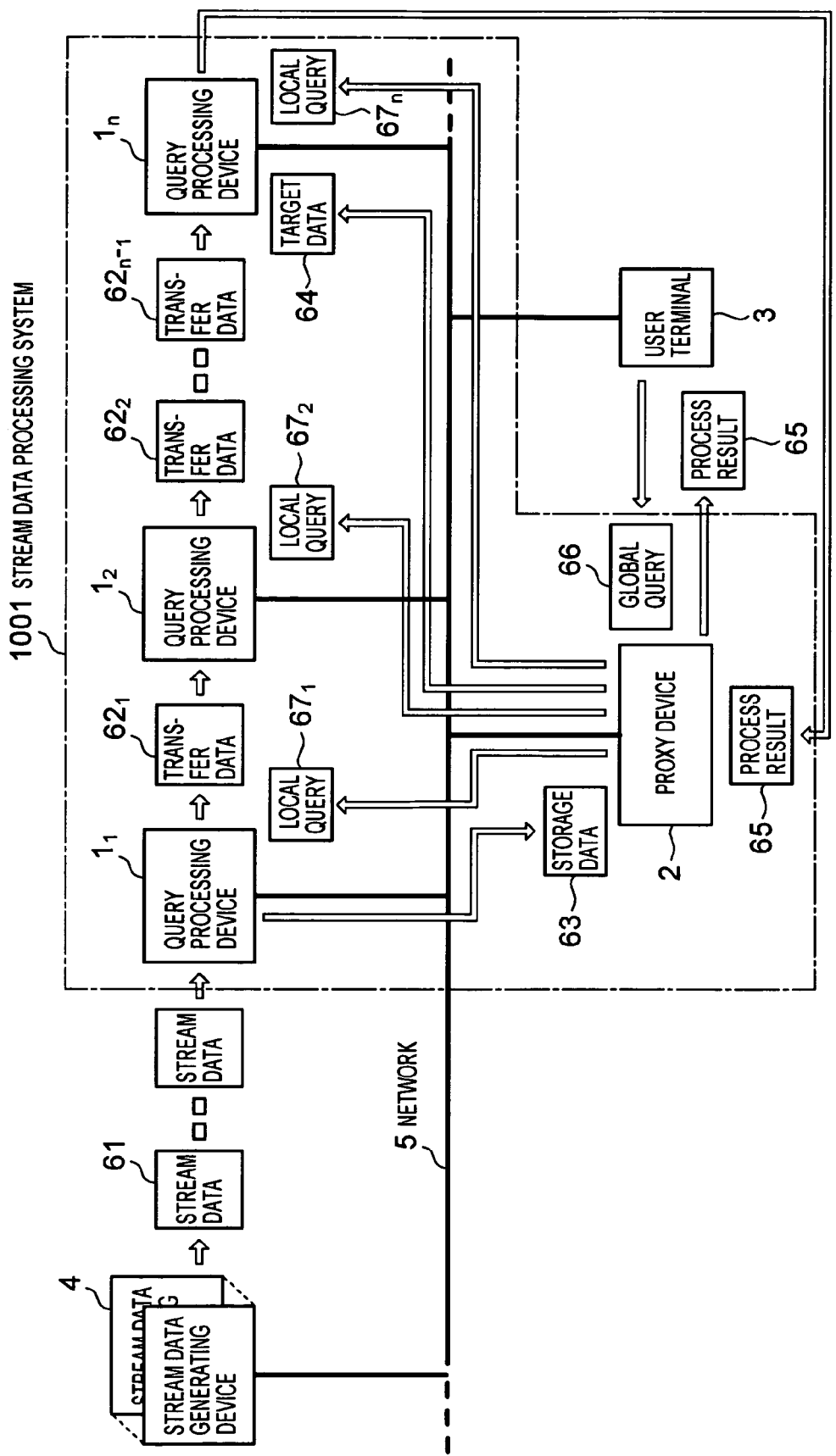

(A) RECORD FORMAT (B) XML DOCUMENT FORMAT

PROXY DEVICE 2

STREAM DATA PROCESSING SYSTEM AND STREAM DATA PROCESSING METHOD

CROSS-REFERENCE TO RELATED APPLICATION

This application is related to U.S. patent application Ser. No. 11/195,664 filed Aug. 3, 2005, entitled "Query Processing Method for Stream Data Processing System", the contents of which are incorporated herein by reference into this application.

CLAIM OF PRIORITY

The present application claims priority from Japanese application JP2005-211483 filed on Jul. 21, 2005, the contents of which is hereby incorporated by reference into this application.

BACKGROUND OF THE INVENTION

The present invention relates to a stream data processing system which executes a query registered beforehand with respect to input stream data and outputs an execution result.

A related art, for example, Motwani, Rajeev; Widom, Jennifer; Arasu, Arvind; Babcock, Brian; Babu, Shivnath; Datar, Mayur; Manku, Gurmeet; Olston, Chris; Rosenstein, Justin; Varma, Rohit, "Query Processing, Resource Management, and Approximation in a Data stream Management System", CIDR2003, 1st of Aug., 2002, [searched on 22nd of Jun., 2005] internet URL:

http://dbpubs.stanford.edu:8090/aux/index-en.html (hereinafter, referred to as Non-patent Document 1) discloses a stream data processing system which executes a query registered beforehand with respect to input stream data and outputs an execution result.

For example, it is assumed that a customer searches a product. The customer generates a query including information on the product and desired conditions for purchasing the product and registers the generated query in the stream data processing system by using a terminal. On the other hand, each product supplier generates stream data including information on a product to offer and desired condition for offering the product and inputs the generated query in the stream data processing system by using a terminal. The stream data processing system continuously executes the query registered beforehand and determines whether or not the information on the product or the desired condition included in the input stream data is matched with the information on the product and the desired condition included in the query. If the information on the product and the desired condition included in the input stream data is matched with the information on the product and the desired condition included in the query, the stream data processing system transmits the stream data concerned to the terminal of the customer.

As described above, the stream data processing system is suitable for use in a real time application such as an Internet auction or a price trend on stocks in which sequentially input stream data should be processed in real time.

SUMMARY OF THE INVENTION

However, in order to execute the query with respect to each of the sequentially input stream data in real time, it is preferred to use a high performance information processing device or a plurality of information processing devices so as to distribute loads. Here, in the case of distributing the loads by using the plurality of information processing devices, a great amount of communication traffic may be occurred by the stream data transferred among the plurality of information processing devices.

Accordingly, it is an object of the present invention to provide a technique which restrains occurrence of communication traffic in the case of distributing loads by using a plurality of information processing devices in the stream data processing system.

In order to solve the above described problems, the stream data processing system according to the invention divides global query, which is a query registered beforehand, into a plurality of processes. Here, as a preferable descriptive method of the query, CQL (Continuous Query Language) shown on the seventh line of the second clause in the above described Non-patent Document 1 can be mentioned. A feature of the query in the steaming data process is that a window can be assigned so as to quarry a data string to be processed from infinitely continuing stream data. As a representative method of assigning the window, (1) a method of assigning the number of data strings to be quarried and (2) a method of assigning time interval of data strings to be quarried can be mentioned. For example, "Rows 50 Preceding" shown in the second clause of Non-patent Document 1 is a preferable example for quarrying data corresponding to 50 lines as a process target (1) and "Range 15 Minutes Preceding" is a preferable example for quarrying data corresponding to 15 minutes as a process target (2). Hereinafter, a window specified according to the method (1) is called as a tuple-based window and a window specified according to the method (2) is called as time-based window.

Reference number 1094 shown in FIG. 15 indicates a tuple-based window whose size is three tuples. The tuple-based window whose size is three tuples holds stream data of arrived last three tuples as a process target. When new process target data 68 arrives, the oldest process target data 69 is ejected from the tuple-based window. On the other hand, reference number 1601 shown in FIG. 16 indicates a time-based window whose seize is three units of time. The time-based window holds stream data corresponding to last three units of time as a process target. The process target data in which the three units of time are past after arrival is ejected from the time-based window.

Next, the stream data processing system generates local queries each including at least one of the processes divided from the global query and sets each local query to information processing devices different from each other. In addition, the stream data processing system transfers stream data among a plurality of information processing devices in order so as to execute the local query with respect to the stream data in each of the information processing devices. At this time, the entire stream data does not transferred among the information processing devices in order. At least a part of the corresponding stream data (for example, data which is first used for a local query process in an information processing device located in backward according to a processing order) is stored in a storage device. The information processing device reads the target data from the storage device and executes the local query, when the stream data received from an information processing device located in immediately before the information processing device concerned does not include the target data of the local query.

For example, the stream data processing system according to the present invention is a stream data processing system which executes a global query registered beforehand with respect to stream data and outputs an execution result thereof including: i-th (where, $1 \leq i \leq n$) query processing devices each of which executes i-th local query composing the global query; and a proxy device which stores storage data including at least apart of the stream data. The i-th query processing device includes: a data receiving unit which receives stream data in the case of i=1 and receives transfer data from the (i−1)-th query processing device in the case of i≠1; a data registration unit which stores the storage data including at least a part of the received stream data to the proxy device in the case of 1≦i<n; a data obtaining unit which accesses the proxy device so as to obtain target data if the storage data includes the target data necessary for processing the i-th local query registered beforehand in the case of 1<i≦n; a local query processing unit that executes the i-th local query registered beforehand with respect to the stream data received by the data receiving unit in the case of i=1, and executes an i-th local query registered beforehand with respect to the transfer data received by the data receiving unit and/or the target data obtained by the data obtaining unit in the case of i≠1; and a data transmission unit which transmits a processing result of the local query processing unit, as transfer data, to an (i+1)-th query processing device in the case of i≠n, and transmits the processing result of the local query processing unit to a predetermined device in the case of i=n. The proxy device includes: a storage data storage unit which receives the storage data from the query processing device and stores the received storage data; and a data reading unit which reads target data requested from the query processing device from the storage data stored in the storage data storage unit and transmits the read target data to the query processing device which is a request source.

According to the present invention, for example, a part of stream data (hereinafter, partial stream data) among the input stream data is stored in a storage device. The partial stream data is used first for the local query process in an information processing device located in backward according to the processing order. Therefore, it is possible to prevent the partial stream data from being transfer among a plurality of information processing devices. Accordingly, occurrence of communication traffic can be restrained when distributing loads by using the plurality of information processing devices.

BRIEF DESCRIPTION OF THE DRAWINGS

FIG. 1 is a schematic view illustrating a stream data processing system according to an embodiment of the present invention;

DESCRIPTION OF THE PREFERRED EMBODIMENTS

Figure 2A:
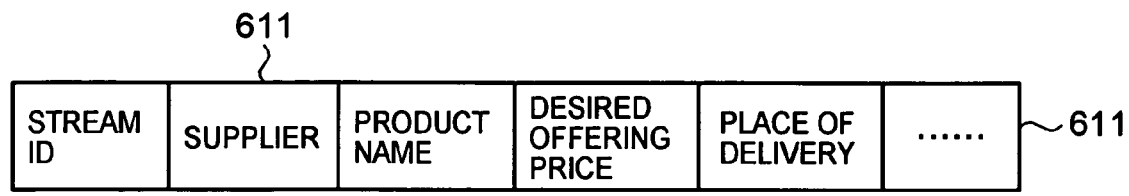
FIGS. 2A and 2B are pattern diagrams illustrating a data format of stream data 61.

Hereinafter, an embodiment according to the present invention will be described.

FIG. 1 is a schematic view of a stream data processing system applied in the present embodiment according to the invention.

As shown in FIG. 1, a stream data processing system 1001 according to the present embodiment includes n query processing devices $1_1$ to $1_n$ (n≧1), a proxy device 2, and a network 5 such as LAN or WAN which connects the query processing devices $1_1$ to $1_n$ with the proxy device 2. In the embodiment as shown in FIG. 1, the stream data processing system 1001 is connected to a steam data generating device 4 and a user terminal 3 through the network 5.

The user terminal 3 transmits a query 66 to the proxy device 2 and receives a result corresponding to the query 66 from the proxy device 2. The query 66 may be an inquiry of information corresponding to a product supplier matched with a desired condition (product name, desired purchase price, place of delivery, settlement method, and so on) or an inquiry of a price trend on stocks for a predetermined items. Hereinafter, the query 66 in which the user terminal 3 transmits to the proxy device 2 will be called as a global query 66. Since a conventional network terminal such as a web browser can be used as the user terminal 3, a detailed explanation thereof will be omitted.

The steam data generating device 4 generates stream data 61 which is a process target of the global query 66 and transmits the generated stream data 61 to the query processing devices $1_1$. The stream data 61 may be the information such as desired condition of the product supplier (product name, desired offering price, place of delivery, settlement method, and so on) or stock quotation (brand and price). In the case that the stream data 61 is the information corresponding to the desired condition of the product supplier, the stream data generating device 4, for example, may be a network terminal of the product supplier. In addition, in the case that the stream data 61 is the stock quotation, the stream data generating device 4, for example, may be a network terminal of a manager of a stock market.

The stream data 61 includes a plurality of segments. One of the segments includes a stream ID which is identification information of the stream data 61. In each of the segments excluding the one segment including the stream ID, information serving as a process unit in accordance with the global data 66 is registered. In addition, a data format of the stream data 61 maybe a record format or an XML document format.

Figure 2B:
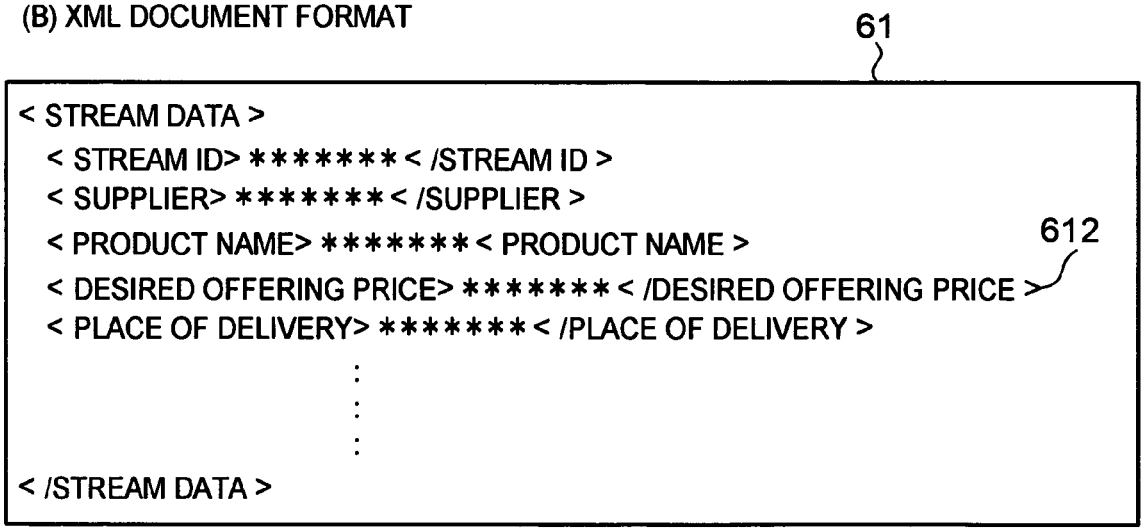

FIGS. 2A and 2B are pattern diagrams illustrating the data format of the stream data 61.

FIG. 2A exemplifies the stream data 61 of a record format. In this case, a column 611 which configures the record corresponds to a segment. In addition, FIG. 2B exemplifies stream data 61 of an XML document format. In this case, a region 612 surrounded by tags which configures the XML document corresponds to a segment.

In the query processing devices $1_1$ to $1_n$, a processing order is allocated. In addition, n local queries $67_1$, to $67_n$ obtained by dividing the global query 66 into n processes are respectively allocated to the query processing devices $1_1$ to $1_n$ according to an execution order. Specifically, a first query processing device $1_1$ executes the local query $67_1$, with respect to the stream data 61. An i-th query processing device $1_i$ (where, $1 \leq i \leq n-1$) transmits a query result as transfer data $62_i$ to the (i+1)-th query processing device $1_{i+1}$. The (i+1)-th query processing device $1_{i+1}$ executes an (i+1)-th local query $67_{i+1}$ with respect to the transfer data $62_i$. The n-th query processing device $1_n$ transmits a query result as a processing result 65 to the proxy device 2.

Figure 3:
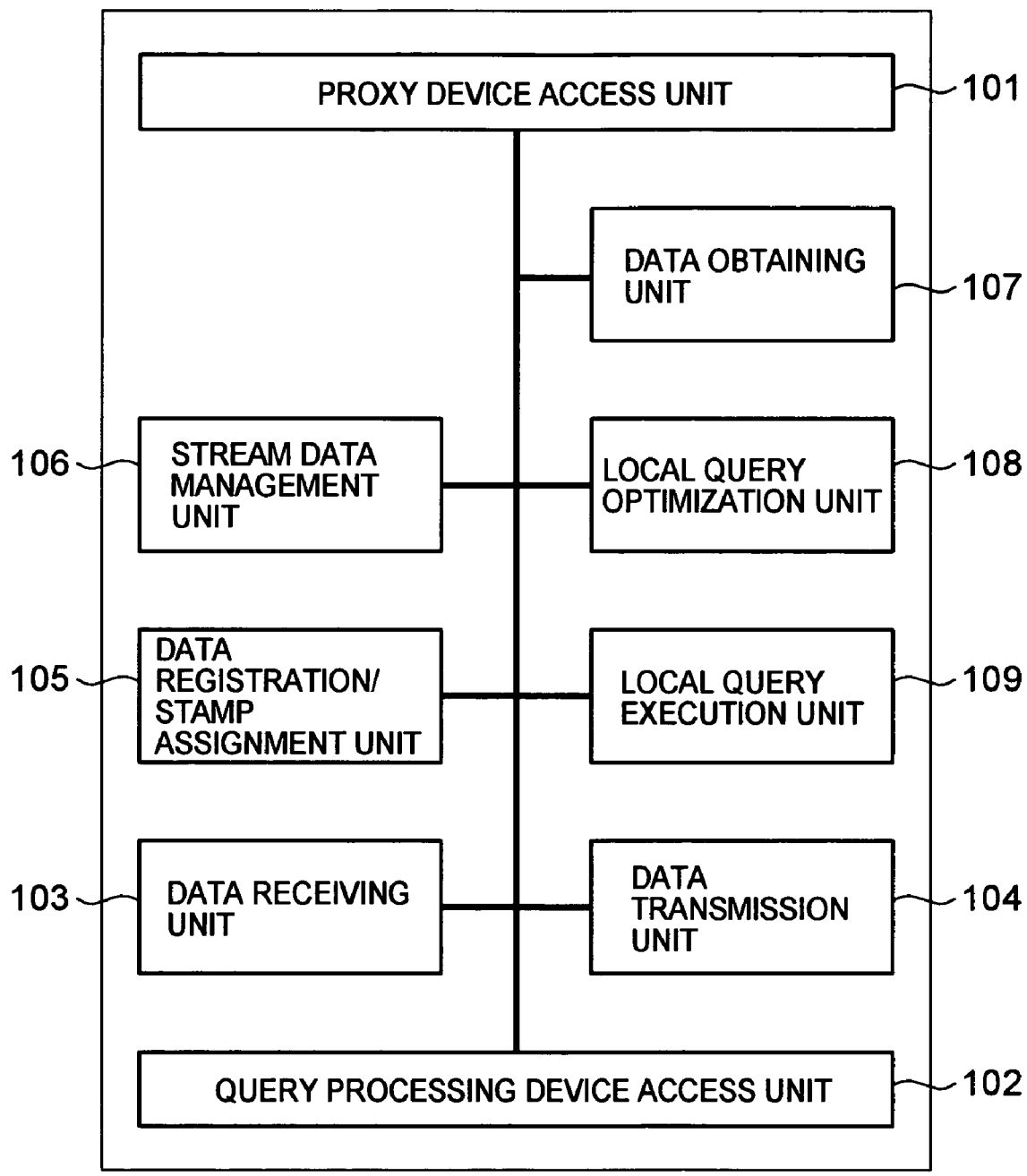
FIG. 3 is a schematic view illustrating query processing devices $1_1$ to $1_n$.

FIG. 3 is a schematic view of the query processing devices $1_1$ to $1_n$.

As shown in FIG. 3, each of the query processing devices $1_1$ to $1_n$ includes a proxy device access unit 101 which communicates with the proxy device 2 through the network 5, a query processing device access unit 102 which communicates with another query processing device $1_1$ to $1_n$ through the network 5, a data receiving unit 103, a data transmission unit 104, a data registration/stamp assignment unit 105, a stream data management unit 106, a data obtaining unit 107, a local query optimization unit 108, and a local query execution unit 109.

The data receiving unit 103 receives the transmission data 62 from another query processing device $1_1$ to $1_{n-1}$, located immediately before own query processing device $1_2$ to $1_{n-1}$ according to the processing order, through the query processing device access unit 102. However, a data receiving unit 103 of the first query processing device $1_1$ receives the stream data 61 from the stream data generating device 4 through the query processing device access unit 102.

The data transmission unit 104 transmits a processing result of the local query execution unit 109 to be described later, as transfer data 62, to another query processing device $1_2$ to $1_n$ located immediately after own query processing device $1_1$ to $1_{n-1}$ according to the processing order, through the query processing device access unit 102. However, the data transmission unit 104 of the n-th query processing device $1_n$ transmits a processing result of the local query execution unit 109, as the processing result 65 of the global query, to the proxy device 2, through the query processing device access unit 102.

The data registration/stamp assignment unit 105 performs following processes in the case of the first query processing device $1_1$. That is, if the data receiving unit 103 receives the stream data 61 from the stream data generating device 4 through the query processing device access unit 102, the data registration/stamp assignment unit 105 quarries the segment predetermined by the proxy device 2 from the received stream data 61. And then, the data registration/stamp assignment unit 105 generates a storage data registration request including the quarried segment and a stream ID of the received stream data 61 and transmits the generated storage data registration request to the proxy device 2 through the proxy device access unit 101. In addition, the data registration/stamp assignment unit 105 receives a system time stamp which indicates the processing order and an expire time stamp which indicates the lifetime in the stream data processing system from the proxy device 2 through the proxy device access unit 101 as a response with respect to the storage data registration request. Thereafter, the data registration/stamp assignment unit 105 assigns the received system time stamp and the expire time stamp to the stream data 61 in which the predetermined segment is quarried.

A method of setting a system time stamp and an expire time stamp of the proxy device 2 will be described with reference to FIGS. 15 and 16. In order to simplify an explanation, in this embodiment, although the time stamp is shown by using sequential numbers in which a value increases one by one such as 001, 002, . . . as time progresses, it is also preferable to use another time mark method such as a time structure of UNIX (registered trademark) operating system.

A system time stamp 681 indicates the time in which the stream data arrives in the stream data processing system. Since the stream data is processed by a window operator when the stream data arrives in the stream data processing system, it can be considered that the system time stamp 681 is the same as a process starting time in the window operator. FIG. 15 shows that process target data 1 and 2 among the process target stream data 69 of the tuple-based window 1094 are arrived in the stream data processing system at the time of 001 and 002, respectively.

On the other hand, the expire time stamp 682 indicates the lifetime of the stream data in the stream data processing system. There are two methods of representing the expire time stamp 682 in accordance with a method of assigning a window of a process target query. FIGS. 15 and 16 show examples of the window assigned as a tuple-based window (in the case of tuple-based window 1094) and a time-based window (in the case of time-based window 1601), respectively.

Figure 15:
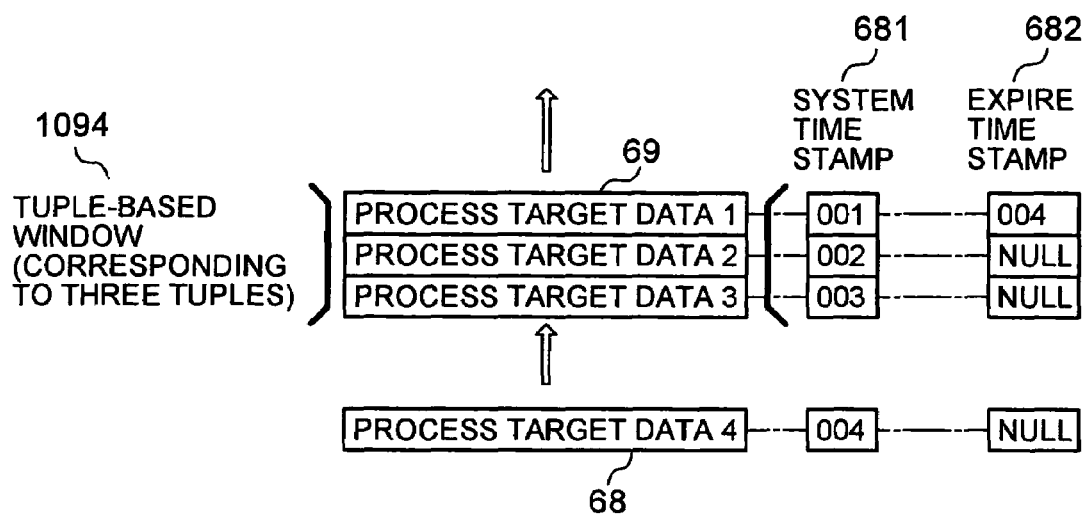
FIG. 15 is a view illustrating a tuple-based window.

In the case of the tuple-based window 1094 as shown in FIG. 15, a value of the expire time stamp 682 can not be determined when the stream data arrives. In the tuple-based window 1094, the lifetime of the stream data ejected from the window is determined for the first time when the number of tuples exceeding the number which can be held by the tuple-based window 1094 arrive. Accordingly, when the stream data arrives in the stream data processing system, the expire time stamp 682 of the stream data concerned is set to 'NULL' as process target data 2 and 3 (69) and process target data 4 (68) as shown in FIG. 15. When the process target data 4 (68) arrives, the process target data 1 (69) is ejected from the tuple-based window 1094 because the number of data (the number of tuples) which can be held by the tuple-based window 1094 is three. Since the system time stamp 681 of the process target data 4 (68) is '004', the expire time stamp 682 of the process target data 1 (69) becomes '004'.

Figure 16:
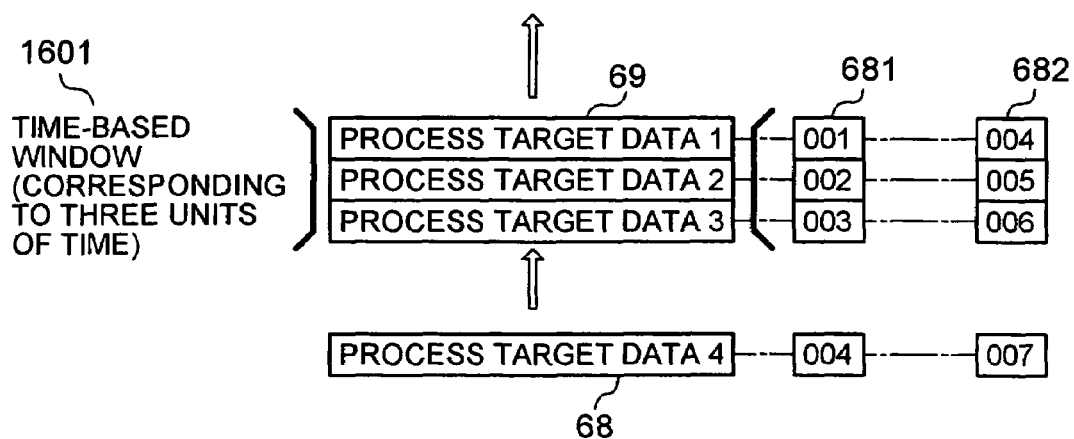
FIG. 16 is a view illustrating a time-based window.

In the case of the time-based window 1601 as shown in FIG. 16, a value of the expire time stamp 682 is determined when process target data arrives in the time-based window 1601. For example, in the embodiment as shown in FIG. 16, since the time-based window 1601 holds data corresponding to three units of the time, values of the expire time stamp 682 corresponding to process target data 1 to 3 (69) arrived at the time of '001', '002', '003' become '004', '005', '006', respectively.

In the case of a first query processing device $1_1$, the stream data management unit 106 performs following processes. That is, the stream data management unit 106 buffers the stream data 61, in which the predetermined segment, having the system time stamp and the expire time stamp assigned by the data registration/stamp assignment unit 105, is quarried, as process target data. Thereafter, the stream data management unit 106 outputs a process target data to the local query execution unit 109 which will be described later, according to an order indicated by the system time stamp. In addition, in the case of a second to n-th query processing devices $1_2$ to $1_n$, the stream data management unit 106 performs following processes. That is, the stream data management unit 106 outputs transfer data $62_1$ to $62_{n-1}$ received from the data receiving unit 103, as a process target data, to the local query execution unit 109 which will be described later, according to the order indicated by the system time stamp.

In addition, the stream data management unit 106 deletes process target data, in which the lifetime indicated by the expire time stamp expires, from a temporal storage, which is a process buffer, prepared in the local query execution unit 109 included in the query processing devices $1_1$ to $1_n$. The method of deleting the process target data will be described later.

In the case of an i-th query processing device $1_i$ (where, $2 \leq i \leq n$), the data obtaining unit 107 performs following processes. That is, if new process target data arrives in the stream data management unit 106, the data obtaining unit 107 generates a target data request including a stream ID of the process target data concerned and a segment assignment predetermined by the proxy device 2. Thereafter, the data obtaining unit 107 transmits the generated target data request to the proxy device 2 through the proxy device access unit 101 and obtains target data from the proxy device 2. The data obtaining unit 107 attaches the obtained target data to the process target data concerned in the stream data management unit 106.

If the local query optimization unit 108 receives a local query candidate from the proxy device 2 through the proxy device access unit 101, the local query optimization unit 108 calculates a query processing cost for the case that the local query candidate concerned is executed in the local query execution unit 109 which will be described later, and transmits the calculated query processing cost to the proxy device 2. Here, the query processing cost can be calculated, for example, by adding a CPU processing cost of the local query candidate (the number of cycles requested by the CPU so as to execute the local query candidate) to an I/O processing cost (cost necessary for an I/O process issued so as to execute the local query candidate). A method of calculating the processing cost corresponding to the stream data is described in a document 'Stratis Viglas, Jeffrey F. Naughton:candidate-based query optimization for streaming information sources SIGMOD Conference 2002, pp. 37-48'.

The local query execution unit 109 executes the local query set by the proxy device 2 with respect to the process target data sequentially input from the stream data management unit 106, assigns a stream ID of the process target data to a corresponding execution result, and outputs the execution result to the data transmitting unit 104 as transfer data $62_i$.

Figure 4:
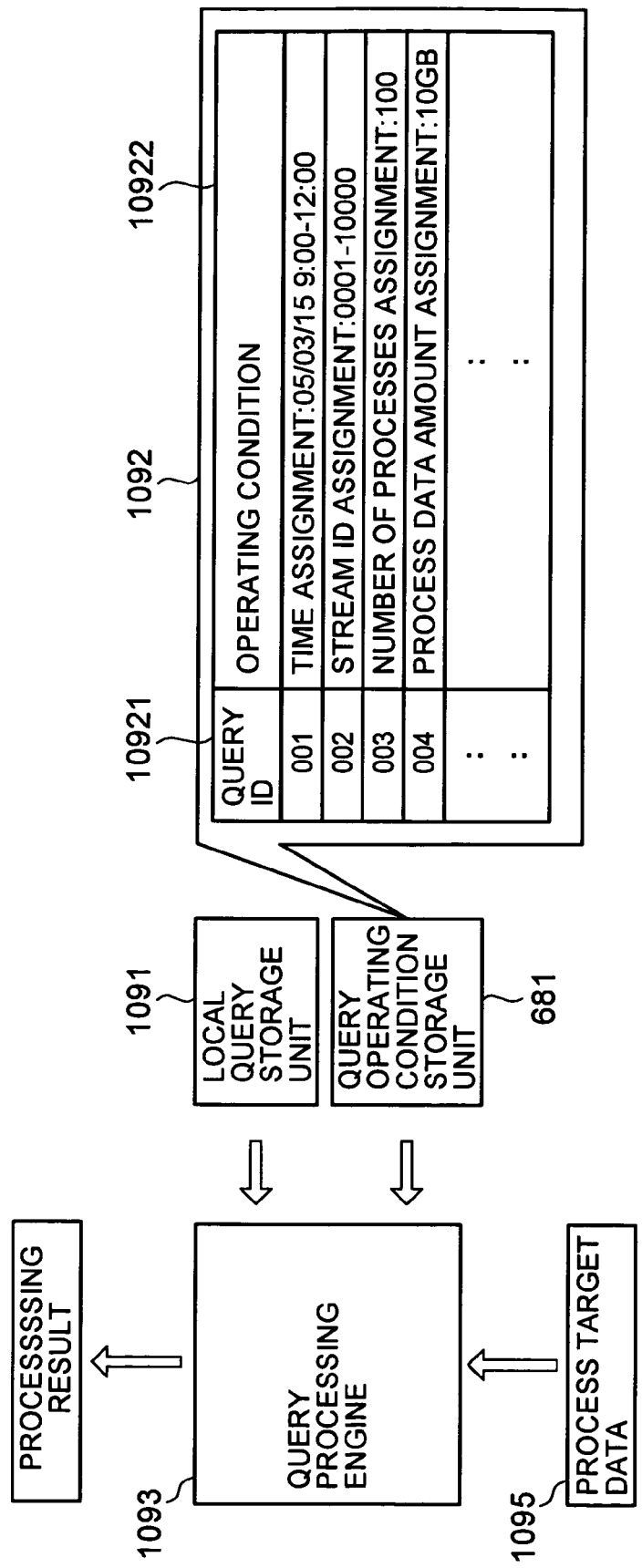
FIG. 4 is a schematic view illustrating a local query execution unit 109.

FIG. 4 is a schematic view of the local query execution unit 109. As shown in FIG. 4, the local query execution unit 109 includes a local query storage unit 1091, a query operating condition storage unit 1092, and a query processing engine 1093.

The local query storage unit 1091 includes a local query having a query ID. In addition, the query operating condition storage unit 1092 stores, for each of the local queries stored in the local query storage unit 1091, a record including an operating condition of the query concerned. The record includes a query ID registration field 10921 for registering a query ID and an operating condition registration field 10922 for registering a operating condition. As a preferable example of the operating condition, assignments for an operating time, a stream ID of process target data, the number of process, and a process data amount can be considered.

A query processing engine 1093 searches a record which satisfies an operating condition registered in the field 10922 from the records stored in the query operating condition storage unit 1092. Thereafter, the query process engine 1093 reads a local query having a query ID registered in the field 10921 of the searched record from the local query storage unit 1091 and continuously executes the read local query with respect to the process target data 1095 arrives in the query processing engine 1093.

Figure 5:
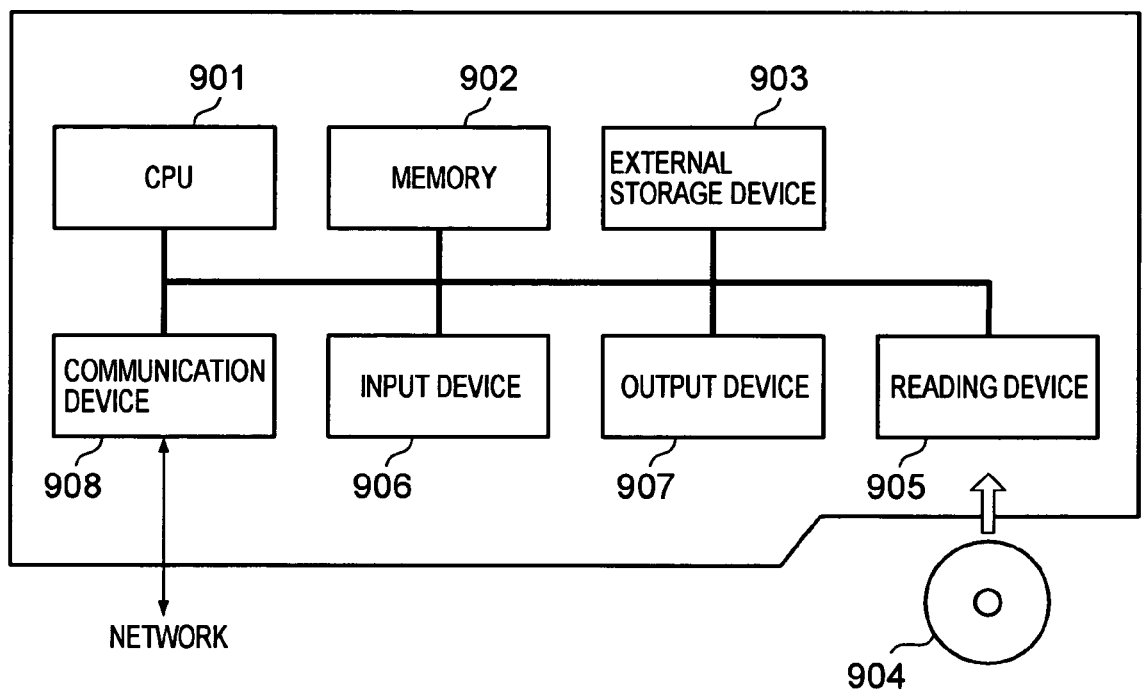
FIG. 5 is a view illustrating an example of hardware configuration of the query processing devices $1_1$ to $1_n$.

The query processing devices $1_1$ to $1_n$ can be embodied with a general computer system, as shown in FIG. 5, which includes a CPU 901, a memory 902, an external storage device 903 such as an HDD, a reading device 905 which reads information from a portable recording medium 904 such as a CD-ROM or a DVD-ROM, an input device 906 such as a keyboard or a mouse, an output device 907 such as a display, a communication device 908 for accessing a communication network, and a bus 909 which connects the above-described devices each other, and by executing a predetermined program loaded on the memory 902 by the CPU 901. It is preferable that the predetermined program is downloaded in the external storage device 903 from the recording medium 904 through the reading device 905 or from the network through the communication device 908, loaded in the memory 902, and executed by the CPU 901. In addition, it is also preferable that the predetermined program is directly loaded on the memory 902 from the recording medium 904 through the reading device 905 or from the network through the communication device 908, and executed by the CPU 901.

Next, an operation of the query processing devices $1_1$ to $1_n$ will be described.

Figure 6:
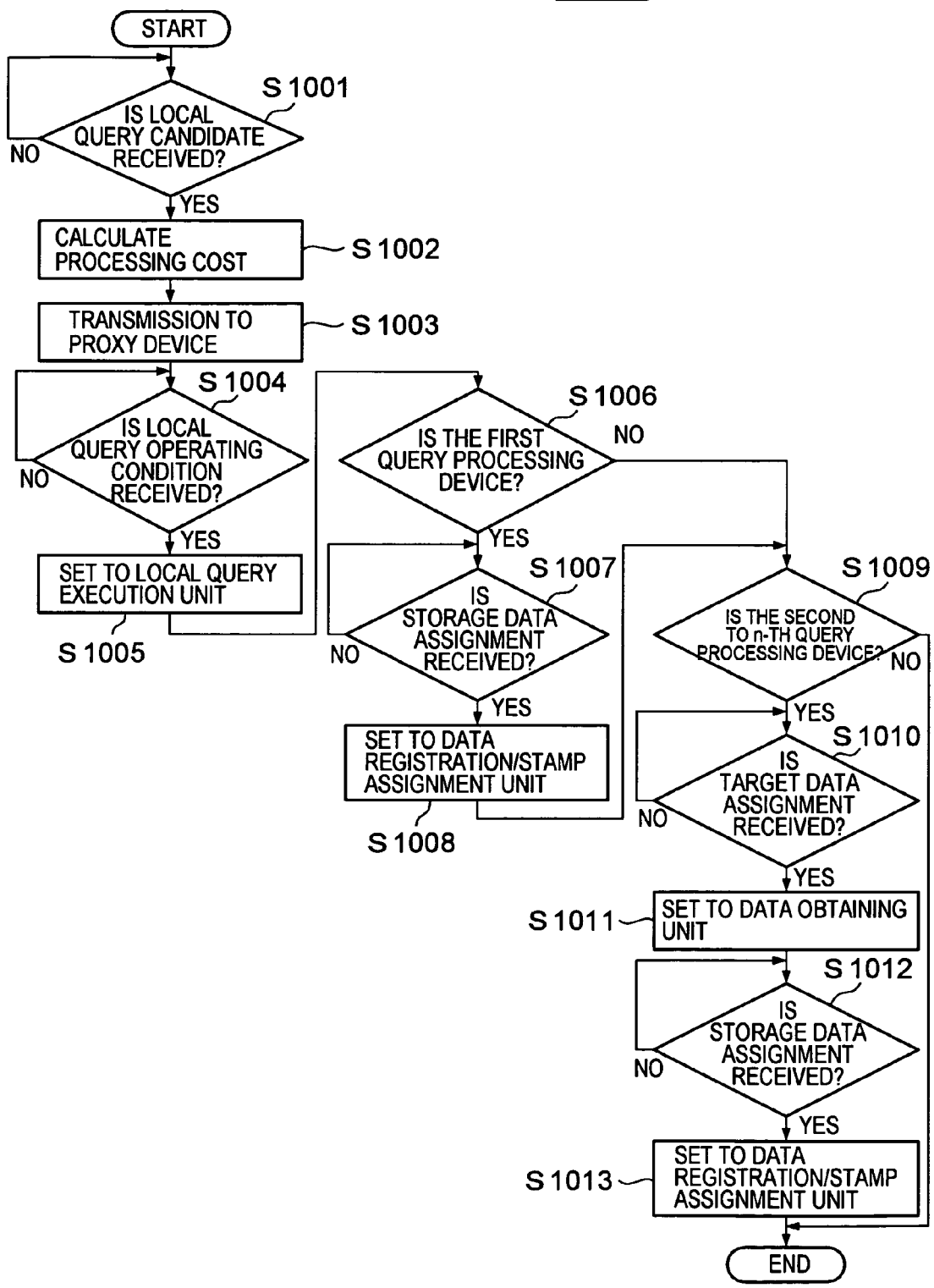
FIG. 6 is a flow chart illustrating an set operation performed by the query processing devices $1_1$ to $1_n$ before the local query is executed.

FIG. 6 is a flow chart illustrating the set operation performed by the query processing devices $1_1$ to $1_n$ before the local query is executed.

If the local query optimization unit 108 receives at least one local query candidate from the proxy device 2 through the proxy device access unit 101 (YES in step S1001), the local query optimization unit 108 calculates, for each of the received local query candidates, a processing cost in which the local query execution unit 109 executes it (S1002) Thereafter, the local query optimization unit 108 transmits the processing cost of each local query candidate to the proxy device 2 through the proxy device access unit 101 (S1003) And then, the process proceeds to step S1004.

In step S1004, if the local query execution unit 109 receives a local query, a query operating condition, and information related to a processing order of each query processing device from the proxy device 2 through the proxy device access unit 101 (YES in step S1004), the local query execution unit 109 sets the received local query and the query operating condition in the local query execution unit 109 (S1005). In addition, the local query execution unit 109 sets the information related to the processing order of each query processing device in the query processing device access unit 102. In accordance with the information related to the processing order of each query processing device, the query processing device access unit 102 recognizes a data input source (the query processing device located immediately before the own query processing device according to the processing order or the stream data generating device) or a data destination (the query processing device located immediately after the own query processing device according to the processing order or the proxy device). Thereafter, the process proceeds to step S1006.

In step S1006, in the case of the first query processing device $1_1$ (YES in step S1006), the data registration/stamp assignment unit 105 waits for an assignment of a segment which configures storage data sent from the proxy device 2 through the proxy device access unit 101 (YES in step S1007). The assigned segment is set to the data registration/stamp assignment unit 105 (S1008). Thereafter, the process proceeds to step S1009.

In step S1009, in the case of the second to n-th query processing devices $1_2$ to $1_n$ (YES in step S1009), the data obtaining unit 107 waits for an assignment of a segment which configures target data sent from the proxy device 2 through the proxy device access unit 101 (YES in step S1010) and sets the assigned segment to the data obtaining unit 107 (S1011). Thereafter, if the own query processing device includes data to be stored in the proxy device, the data obtaining unit 107 waits for an assignment of a segment which configures storage data sent from the proxy device 2 through the proxy device access unit 101 (YES in step S1012). And then, the data obtaining unit 107 sets the assigned segment to the data registration/stamp assignment unit 105 (S1013) and the process are terminated.

Figure 7:
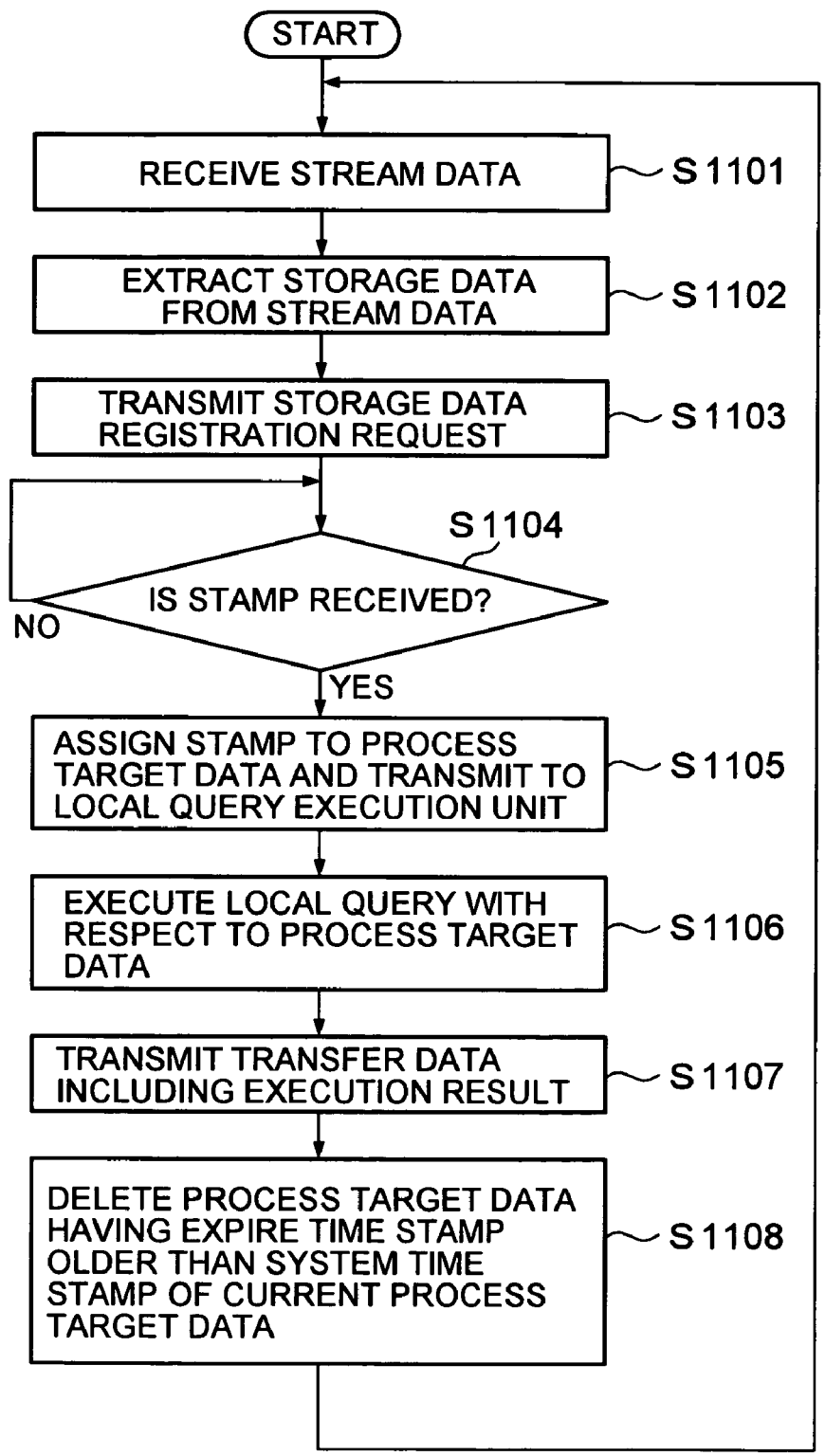
FIG. 7 is a flow chart illustrating a query processing operation of a first query processing devices $1_1$.

FIG. 7 is a flow chart illustrating a query processing operation of the first query processing device $1_1$.

If the data receiving unit 103 receives the stream data 61 from the stream data generating device 4 through the query processing device access unit 102 (S1101), the data receiving unit 103 informs the stream data 61 concerned to the data registration/stamp assignment unit 105. The data registration/stamp assignment unit 105 quarries the segment which configures the storage data assigned by the proxy device 2 from the stream data 61 informed from the data receiving unit 103 (S1102). Thereafter, the data registration/stamp assignment unit 105 generates a storage data registration request including the extracted segment and the stream ID of the stream data 61 informed from the data receiving unit 103, and transmits the generated storage data registration request to the proxy device 2 through the proxy device access unit 101 (S1103). And then, the data registration/stamp assignment unit 105 waits for the system time stamp 681 and the expire time stamp 682, as a response corresponding to the storage data registration request, sent from the proxy device 2 (S1104). Next, the data registration/stamp assignment unit 105 adds the system time stamp 681 and the expire time stamp 682 received from the proxy device 2 to the stream data 61 from which the segment which configures the above-described storage data is quarried, and informs it to the stream data management unit 106, as the process target data. After receiving the stream data 61, the stream data management unit 106 transmits the process target data including the system time stamp 681 and the expire time stamp 682 to the local query execution unit 109 (S1105).

In addition, the local query execution unit 109 executes the local query which satisfies the query operating condition set by the proxy device 2 with respect to the process target data 68 transferred from the stream data management unit 106 along the order of the system time stamp 681 (S1106). And then, the local query execution unit 109 transmits an execution result thereof to the data transmission unit 104. After receiving the execution result, the data transmission unit 104 generates transfer data 62 including the stream ID of the process target data 68, the system time stamp 681 and the expire time stamp 682, and the execution result of the local query corresponding to the process target data 68 concerned, and transmits the generated transfer data 62 to the second query processing device $1_2$ through the query processing device access unit 102 (S1107). In addition, the stream data management unit 106 deletes process target data which has the expire time stamp whose value is older than the system time stamp of the process target data 68 read by the local query execution unit 109 and being a current process target, from a temporal storage which is a process buffer prepared in the local query execution unit included in the own query processing device (S1108).

Figure 8:
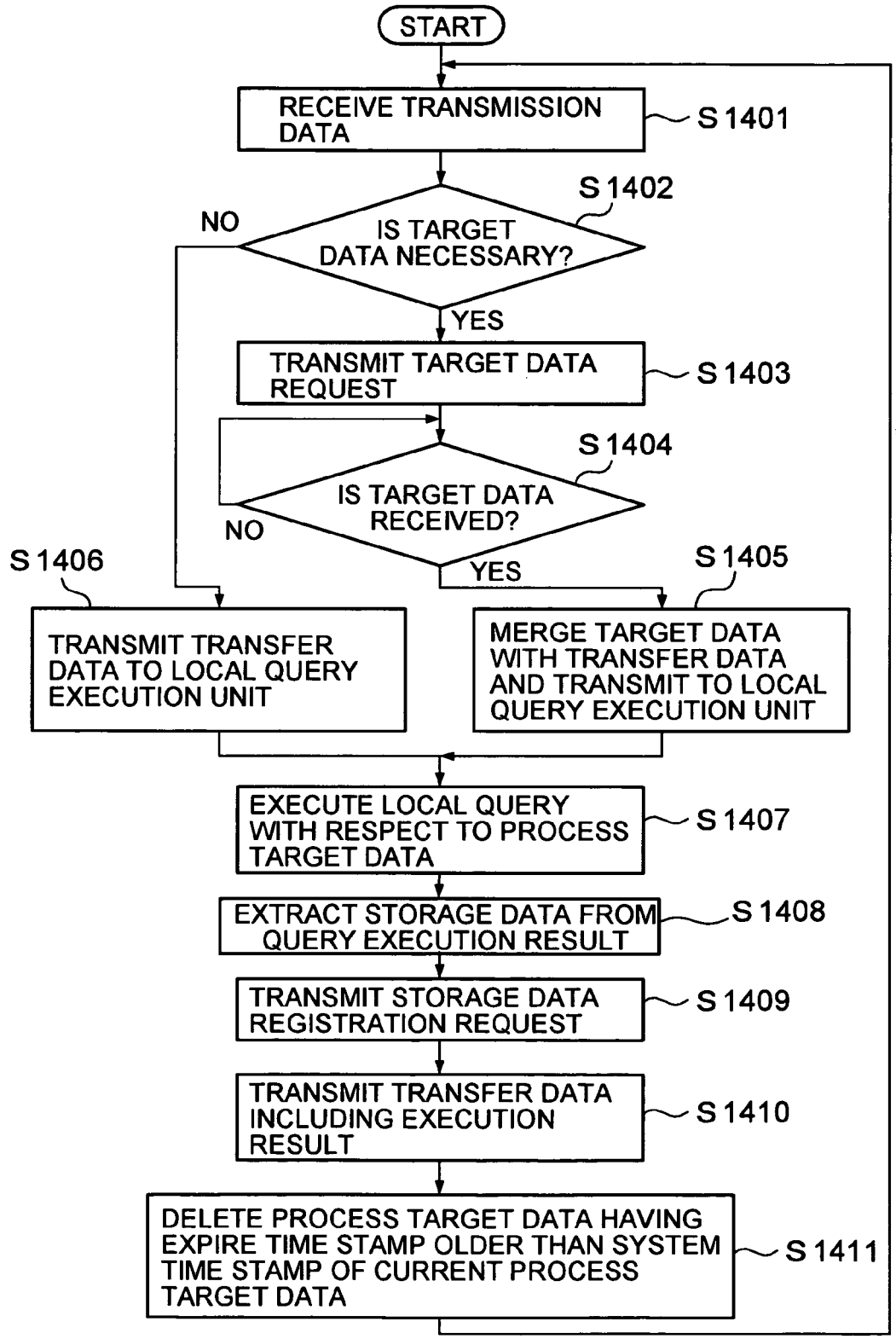
FIG. 8 is a flow chart illustrating a query processing operation of second to n-th query processing devices $1_2$ to $1_n$.

FIG. 8 is a flow chart illustrating a query processing operation of the second to n-th query processing devices $1_2$ to $1_n$.

If the data receiving unit 103 receives the transfer data 62 from the query processing device $1_1$ to $1_{n-1}$ located immediately before the own processing device $1_2$ to $1_n$ according to the processing order, through the query processing device access unit 102 (S1401), the data receiving unit 103 informs a stream ID included in the transmission data 62 concerned to the data obtaining unit 107. If a segment which configures the target data is assigned by the proxy device 2 (YES in step S1402), the data obtaining unit 107 generates a target data request including the stream ID informed by the data receiving unit 103 and the assignment of the segment which configures the target data, and transmits the generated target data request to the proxy device 2 through the proxy device access unit 101 (S1403). If the data obtaining unit 107 receives the target data from the proxy device 2 (S1404), the data obtaining unit 107 informs the received target data to the data receiving unit 103. On the other hand, if the proxy device 2 does not assign a segment which configures the target data (NO in step S1402), the data obtaining unit 107 informs that the target data is not necessary to the data receiving unit 103. If the data receiving unit 103 receives the target data from the data obtaining unit 107, the data receiving unit 103 attaches the target data to the transfer data 62 and transmits the transfer data 62 as the process target data 68 to the local query execution unit 109 (S1405). On the other hand, if the data receiving unit 103 receives from the data obtaining unit 107 a notice that the target data is not necessary, the data receiving unit 103 transmits the transfer data 62 as the process target data 68 to the local query execution unit 109 (S1406).

In addition, the local query execution unit 109 executes a local query which satisfies the query operating condition set by the proxy device 2 with respect to the transmitted process target data 68 (S1407). Thereafter, the local query execution unit 109 transmits an execution result thereof with the stream ID, the system time stamp 681, and the expire time stamp 682 of the process target data 68 concerned to the data transmission unit 104. The local query execution unit 109 also quarries a segment which configures storage data assigned by the proxy device 2 from the execution result (S1408). Next, the local query execution unit 109 generates a storage data registration request including the quarried segment and the stream ID, and transmits the storage data registration request to the proxy device 2 through the proxy device access unit 101 (S1409). The data transmission unit 104 generates transfer data $62_i$ (where, $2 \leq i < n$) including the stream ID of the process target data 68, the system time stamp 681 and the expire time stamp 682, and the execution result of the local query with respect to the process target data 68 concerned. The data transmission unit 104 transmits the generated transfer data $62_i$ to the query processing devices $1_3$ to $1_n$ located in immediately after the own query processing devices $1_2$ to $1_{n-1}$ according to the processing order, through the query processing device access unit 102. Furthermore, in the case of the n-th (last) query processing device $1_n$, the data transmission unit 104 transmits the execution result of the local query with respect to the process target data 68 concerned, as the processing result 65 of the global query, to the proxy device 2 through the proxy device access unit 101 (S1410).

In addition, the stream data management unit 106 deletes process target data, which is read by the local query execution unit 109 and has the expire time stamp whose value is older than the system time stamp of the process target data 68 which is a current process target, from a temporal storage in the own query processing device (S1411).

Returning to FIG. 1, the explanation will be continued.

The proxy device 2 generates n local queries $67_1$, to $67_n$ by dividing the global query 66 received from the user terminal 3 into n processes and sets the local queries $67_1$, to $67_n$ to the query processing devices $1_1$ to $1_n$ in order, respectively. That is, i-th local query $67_i$ is set to the i-th query processing device $1_i$ (where, $1 \leq i \leq n$). In addition, the proxy device 2 determines, for each of the segments which configures the stream data 61, whether transmitting the segment concerned to desired query processing devices $1_1$ to in through other query processing devices $1_1$ to $1_n$, or transmitting the segment concerned to the desired query processing devices $1_1$ to in through the proxy device 2. Thereafter, the proxy device 2 sets, according to determined contents, the segments (segments each of which configures the storage data) which pass through the proxy device 2 to the query processing device $1_i$ (where, $1 \leq i < n$) and sets the segments (segments each of which configures the target data) which pass through the proxy device 2 to the query processing devices $1_i$ (where, $1 \leq i \leq n$) which execute the local query with respect to these segments.

Figure 9:
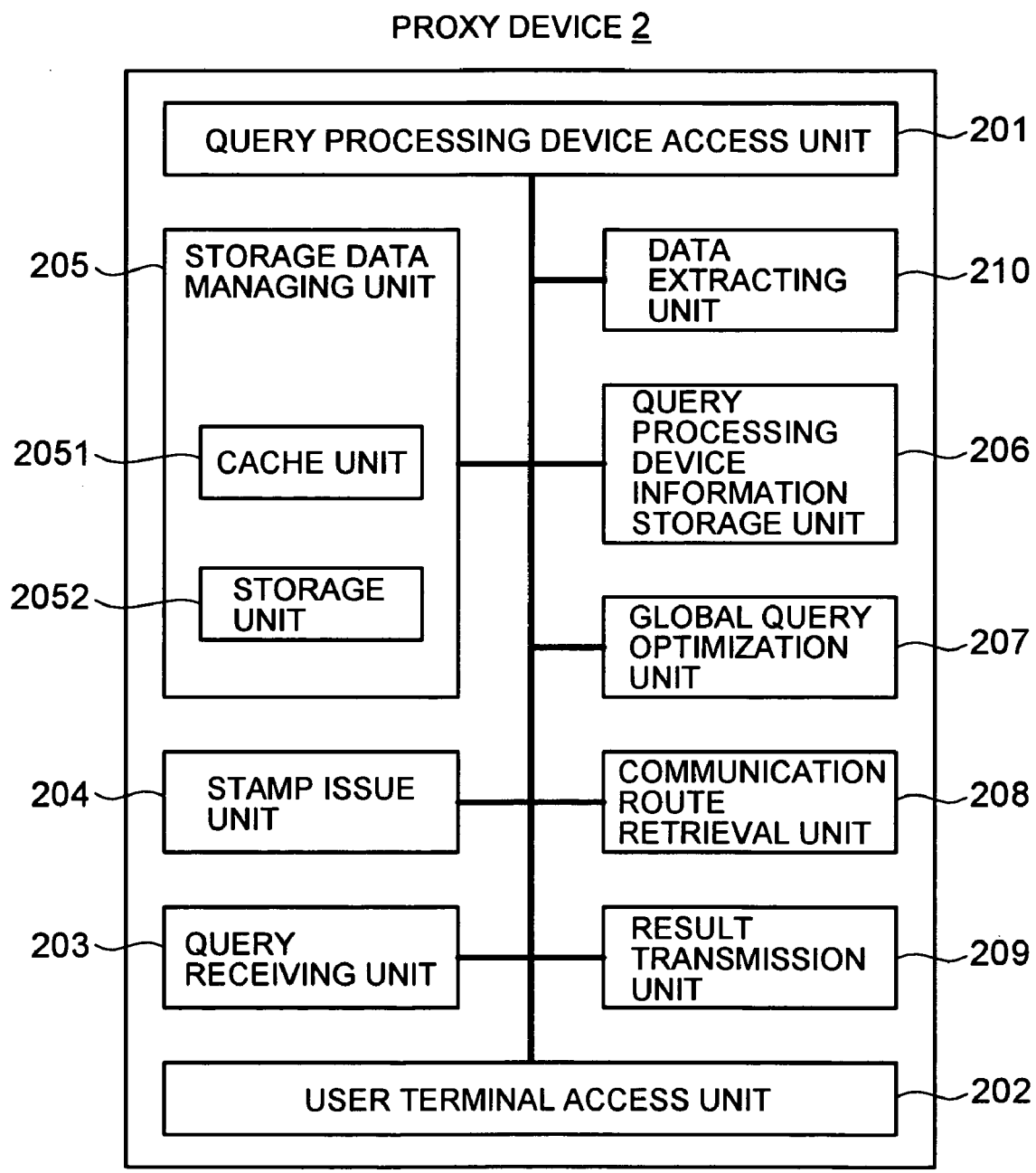
FIG. 9 is a schematic view illustrating a configuration of a proxy device 2.

FIG. 9 is a schematic view illustrating a configuration of the proxy device 2.

As shown in FIG. 9, the proxy device 2 includes a query processing device access unit 201 which communicates with the query processing device $1_1$ to $1_n$ through the network 5, a user terminal access unit 202 which communicates with the user terminal 3 through the network 5, a query receiving unit 203, a stamp issue unit 204, a storage data management unit 205, a query processing device information storage unit 206, a global query optimization unit 207, a communication route searching unit 208, a result transmission unit 209, and a data extracting unit 210.

The query receiving unit 203 receives the global query 66 and the query operating condition from the user terminal 3 through the user terminal access unit 202. The query processing device information storage unit 206 stores information (for example, address or specification) of a query processing device which can be used in the stream data processing system according to this embodiment.

The global query optimization unit 207 divides the global query 66 received by the query receiving unit 203 to n processes (where, n≦the number of query processing devices in which the information is stored in the query processing device information storage unit 206). The global query optimization unit 207 generates first to n-th local queries $67_1$ to $67_n$ including the divided process and sets the local queries $67_1$ to $67_n$ to the n query processing devices $1_1$ to $1_n$ in the order, respectively. Here, the global query optimization unit 207 is associated with each local query optimization unit 108 and generates the local queries $67_1$, to $67_n$ to be set to the query processing devices $1_1$ to $1_n$ such that entire processing cost can be minimized.

The communication route searching unit 208 determines a communication route of each segment which configures the stream data 61 such that a communication cost at the network 5 of each segment can be minimized. In particular, the communication route searching unit 208 compares, as to the segment subjected to the local query to be executed by the i-th query processing device $1_i$ (where, $1 < i \leq n$), a communication cost in which the i-th query processing device $1_i$ obtains the segment concerned through the j-th to the (i-1)-th query processing devices $1_j$ to $1_{i-1}$ (where, j<i) with a communication cost in which the i-th query processing device $1_i$ obtains the segment concerned through the j-th query processing device $1_j$ and the proxy device 2. And then the communication route searching unit 208 selects a communication route having a lower communication cost. Thereafter, the communication route searching unit 208 sets the segment which is quarried from the stream data 61 and is transmitted to the proxy device 2 as the storage data to the query processing device $1_j$ ($1 \leq j < n$) according to the selected communication route. In addition, the communication route searching unit 208 sets the segment which is obtained by the query processing devices $1_2$ to $1_n$ from the proxy device 2 as target data of the local query, to the query processing devices $1_2$ to $1_n$.

If the stamp issue unit 204 receives the storage data registration request from the first query processing device $1_1$ through the query processing device access unit 201, the stamp issue unit 204 generates and transmits the system time stamp 681 which indicates a processing order, the expire time stamp 682, and the stream ID to the first query processing device $1_1$ through the query processing device access unit 201. In addition, the stamp issue unit 204 informs at least one segment included in the storage data registration request concerned to the storage data management unit 205 with the generated system time stamp 681, the expire time stamp 682, and the stream ID.

The storage data management unit 205 registers the stream ID, at least the one segment, the system time stamp 681, and the expire time stamp 682 from the stamp issue unit 204 in a cache unit 2051 as storage data. In addition, the storage data management unit 205 moves storage data which has been not accessed during the predetermined time from the cache unit 2051 to the storage unit 2052.

The data extracting unit 210 searches, in response to the target data request received from the second to n-th query processing devices $1_2$ to $1_n$ through the query processing device access unit 201, storage data which has the stream ID included in the target data request concerned from the storage data management unit 205, and extracts data of the segment assigned in the target data request concerned from the searched storage data. Thereafter, the data extracting unit 210 transmits the extracted data of the segment, as the target data, to a transmission source of the target data request concerned.

The result transmission unit 209 transmits the processing result of the global query received from the n-th query processing device $1_n$ through the query processing device access unit 201 to the user terminal 3 through the user terminal access unit 202.

The above-described proxy device 2, in the same way as the query processing devices $1_1$ to $1_n$, can be realized, for example, by the CPU 901 of the computer system as shown in FIG. 5 executing a predetermined program loaded in the memory 902. It is preferable that the predetermined program is downloaded to the external storage device 903 from the recording medium 904 through the reading device 905 or from the network through the communication device 908, loaded in the memory 902, and executed by the CPU 901. In addition, it is also preferable that the predetermined program is directly loaded in the memory 902 from the recording medium 904 through the reading device 905 or from the network through the communication device 908 and executed by the CPU 901.

Next, operations of the proxy device 2 having the above-described configuration will be described.

Figure 10:
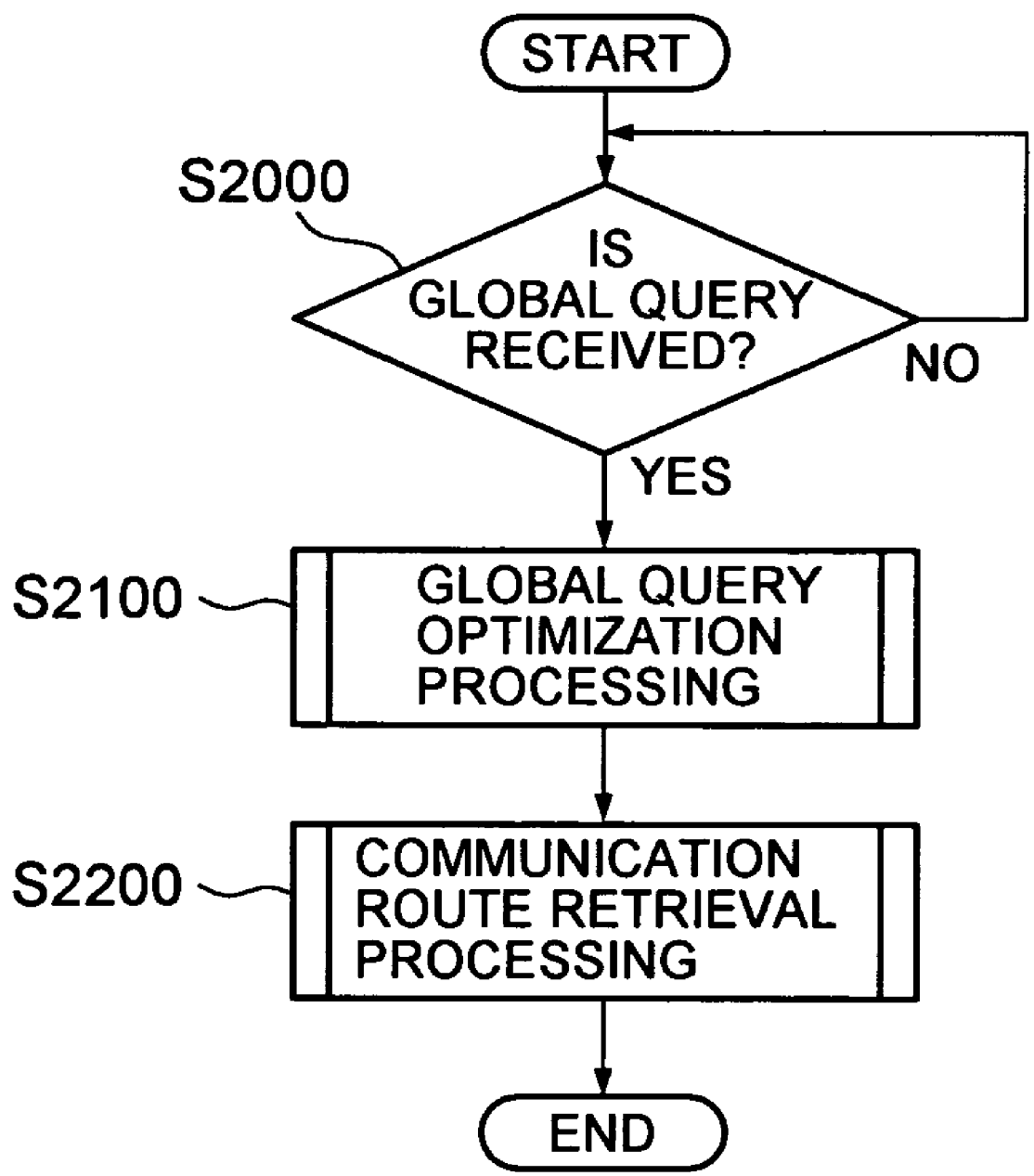
FIG. 10 is a flow chart illustrating an operation set by the proxy device 2 before a global query is executed.

FIG. 10 is a flow chart illustrating an set operation performed by the proxy device 2 before the global query is executed.

If the global query optimization unit 207 receives a global query 66 with the query operating condition from the user terminal 3 through the user terminal access unit 202 (YES in step S2000), the global query optimization unit 207 executes a global query optimization processing which will be described later so as to set the local queries $67_1$ to $67_1$ with the query operating condition in the query processing devices $1_1$ to $1_n$ (S2100). The communication route searching unit 208 executes a communication route retrieval processing, which will be described later, so as to determine the communication route of the stream data 61 output from the stream data generating device 4. And then, communication route searching unit 208 sets the segment which configures the storage data to the query processing device $1_1$ according to the determination contents, and sets the segment which configures the target data to the query processing devices $1_1$ to $1_n$ which execute the local query with respect to the segment concerned (S2200).

Figure 11:
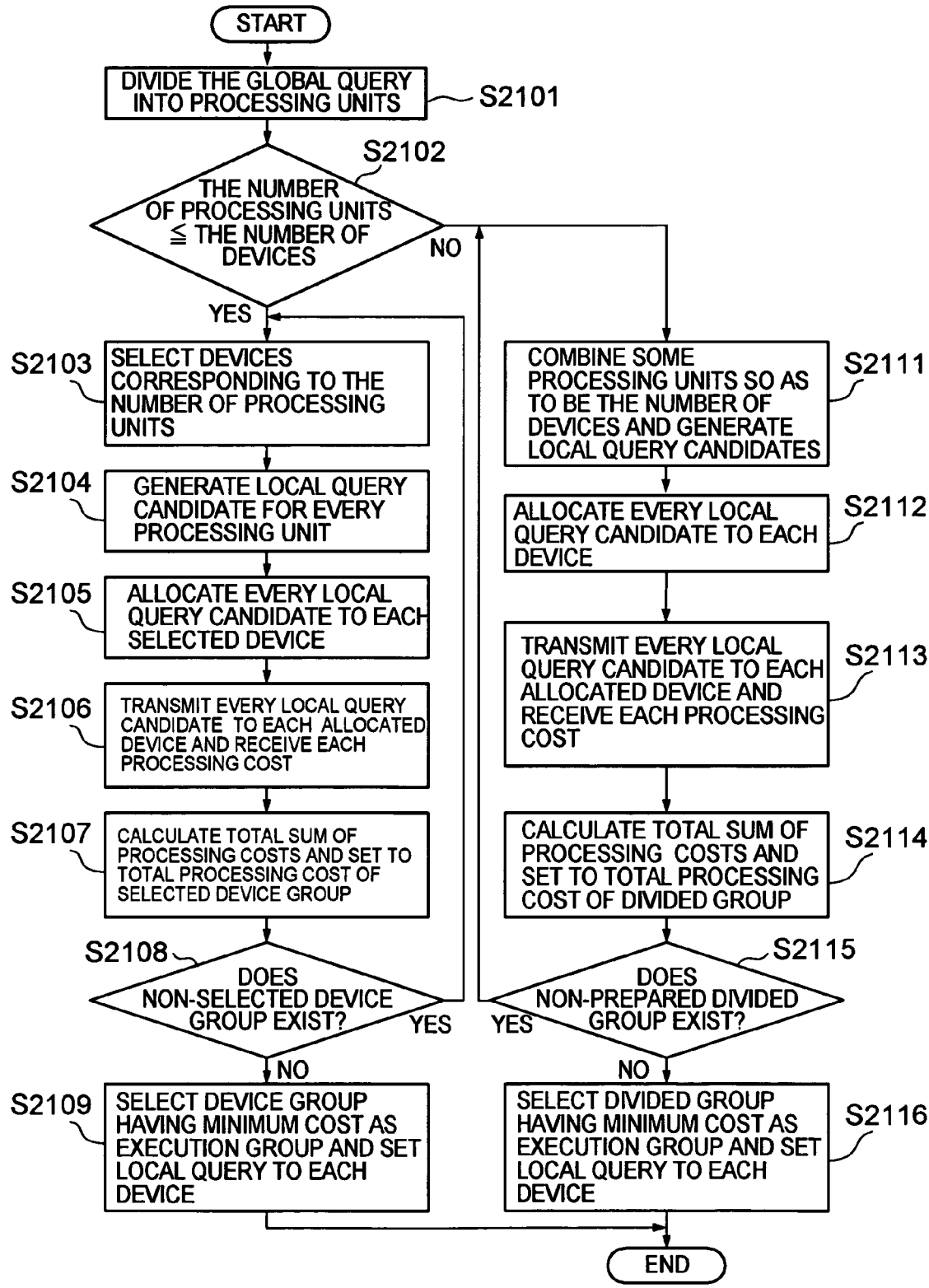
FIG. 11 is a flow chart explaining a global query optimization processing (S2100) shown in FIG. 10.

FIG. 11 is a flow chart explaining the global query optimization processing (S2100) shown in FIG. 10.

First, the global query optimization unit 207 divides the global query 66 received from the user terminal 3 through the user terminal access unit 202 in a process unit (S2101). The global query optimization unit 207 checks whether or not the number of division of the global query is less than the number of query processing devices stored in the query processing device information storage unit 206 (S2102). If the number of division of global query is less than the number of query processing devices (YES in step S2102), the process proceeds to step S2103. On the other hand, if the number of division of global query is not less than the number of query processing devices (NO in step S2102), the process proceeds to step S2111.

In step S2103, the global query optimization unit 207 randomly selects, with reference to the query processing device information storage unit 206, the query processing devices corresponding to the above-described number of division of the global query among the query processing devices in which information is stored in the query processing device information storage unit 206, randomly assigns a processing order to each of the selected query processing devices, to generate a candidate of a device group which will process the global query.

In addition, the global query optimization unit 207 generates, for every process unit divided from the global query in step S2101, a local query candidate including the process unit concerned. Thereafter, the global query optimization unit 207 assigns a processing order to each local query candidate (S2104). Here, each processing order assigned to the local query candidate may be an execution order (mentioned order) of the process included in the local query candidate concerned in the global query.

Next, the global query optimization unit 207 allocates the local query candidates generated in step S2104 to the query processing devices selected in step S2103 (S2105) In particular, the i-th local query candidate (where, $1 \leq i \leq n$ =the number of division of the global query) is allocated to i-th query processing device.

Next, the global query optimization unit 207 transmits, to each of the query processing devices selected in step S2103, the local query candidate allocated to the query processing device concerned through the query processing device access unit 201. Thereafter, the global query optimization unit 207 receives, from each query processing device, the processing cost in the case that the query processing device concerned executes the local query candidate allocated to the own query processing device, through the query processing device access unit 201 (S2106).

Next, the global query optimization unit 207 calculates total sum of the processing costs received from each query processing device selected in step S2103 and the consider the total sum of the processing costs as the total processing cost of the device group candidate generated in step S2103 (S2107).

In addition, the global query optimization unit 207 determines, with reference to the query processing device information storage unit 206, whether or not a new device group candidate (combination of non-selected devices) can be generated by using the query processing device whose information is stored in the query processing device information storage unit 206 (S2108). It is determined that the new device group candidate can be generated (YES in step S2108), the process returns to step S2103 and the process is continued. On the other hand, it is determined that the new device group candidate can not be generated (NO in step S2108), The device group candidate whose total processing cost is minimized is selected from the device group candidates generated in step S2103. And then, the global query optimization unit 207 transmits, to each of the query processing devices of the selected device group, the local query candidate allocated to the query processing device concerned, as the local query, with information related to the processing order of each query processing device, through the query processing device access unit 201 (S2109). In addition, for each query processing device to which the local query is allocated, information on the query processing device concerned and information on the local query allocated to the query processing device concerned are informed to the communication route searching unit 208.

On the other hand, in step S2111, the global query optimization unit 207 combines a part of the process units divided from the global query so as to equal the number of division of the global query (the number of processes) and the number of the query processing devices whose information is stored in the query processing device information storage unit 206. Here, the combining process unit to be combined maybe sequential according to the execution order (mentioned order) of the global query. The global query optimization unit 207 generates, for each process, the local query candidate including the process concerned. Accordingly, the local query candidate is generated as many as the number of the query processing devices whose information is stored in the query processing device information storage unit 206. Thereafter, the global query optimization unit 207 assigns the processing order to each local query candidate and generates the local query group candidate. Here, the processing order assigned to the local query candidate may be the execution order (mentioned order) of the process included in the local query candidate concerned in the global query.

Next, the global query optimization unit 207 randomly assigns the processing order to each query processing device whose information is stored in the query processing device information storage unit 206. The global query optimization unit 207 allocates the local query candidate generated in step S2111 to each query processing device whose information is stored in the query processing device information storage unit 206 (S2112). In particular, the i-th local query candidate (where, $1 \leq i \leq n$ =the number of division of the global query) is allocated to the i-th query processing device.

Next, the global query optimization unit 207 transmits, to each query processing device in which information is stored in the query processing device information storage unit 206, the local query candidate allocated to the query processing device concerned, through the query processing device access unit 201. In addition, the global query optimization unit 207 receives, from each query processing device, the processing cost in the case that the query processing device concerned executes the local query candidate allocated to the own query processing device, through the query processing device access unit 201 (S2103).

Next, the global query optimization unit 207 calculates the total sum of the processing costs received from each query processing device whose information is stored in the query processing device information storage unit 206 and considers the calculated total sum of the processing costs as a total processing cost of the local query group candidate generated in step S2111 (S2114).

Next, the global query optimization unit 207 combines a part of the process units divided from the global query and determines whether or not a new local query group candidate (combination of non-selected processes) can be generated so as to equal the number of division of the global query (the number of processes) and the number of query processing devices whose information is stored in the query processing device information storage unit 206 (S2115). It is determined that the new local query group candidate can be generated (YES in step S2115), the process returns to step S2111 and the process is continued. On the other hand, it is determined that the new local query group candidate can not be generated (NO in step S2115), the local query group candidate whose total processing cost is minimized is selected from the local query group candidates generated in step S2111. And then, the global query optimization unit 207 transmits, to each of the query processing devices whose information is stored in the query processing device information storage unit 206, the local query candidate allocated to the query processing device concerned in the selected local query group candidate, as the local query, with the query operating condition and the information related to the processing order of each query processing device, through the query processing device access unit 210 (S2116). In addition, in every query processing device to which the local query is allocated, information on the query processing device concerned and information one the local query allocated to the query processing device concerned are informed to the communication route searching unit 208.

Figure 12:
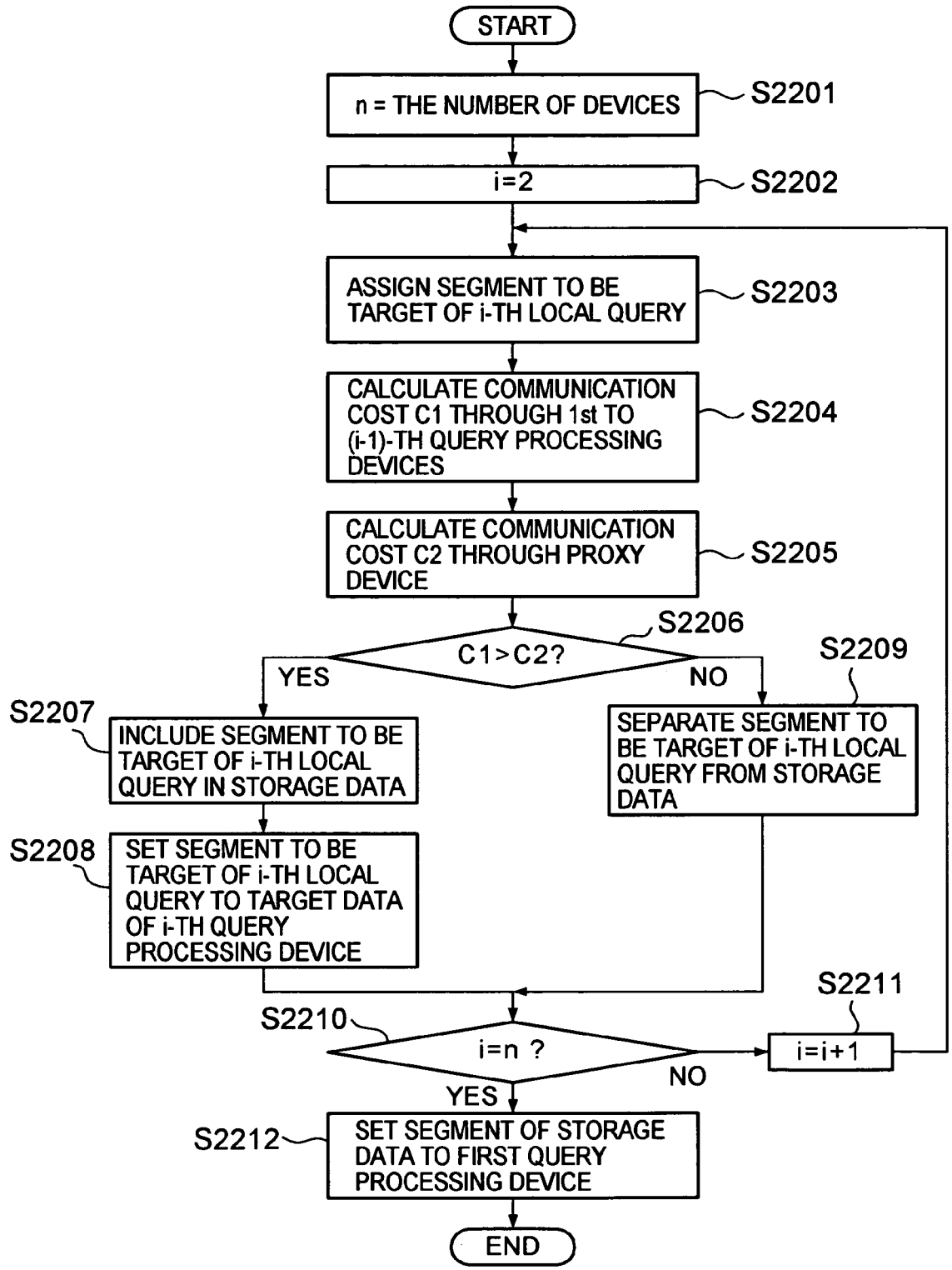
FIG. 12 is a flow chart illustrating a communication route retrieval processing (S2200) shown in FIG. 10.

FIG. 12 is a flow chart illustrating the communication route retrieval processing (S2200) shown in FIG. 10.

First, the communication route searching unit 208 sets n to the number of query processing devices (=the number of local queries) informed by the global query optimization unit 207 (S2201). Next, the communication route searching unit 208 sets i=2 (S2202).

Thereafter, the communication route searching unit 208 assigns the segment to be a target of the local query allocated to the i-th query processing device informed by the global query optimization unit 207 (S2203).

Next, the communication route searching unit 208 calculates a communication cost C1 in the case that the assigned segment arrives in the i-th query processing device through the j-th to (i−1)-th query processing devices (where, $1 \leq j < i \leq n$) (S2204). For example, in the case that the communication cost per size of the data unit between the query processing devices is set to U1, the communication cost C1 can be calculated by the total sum of each query processing device as 'data size of the segment transferred between the query processing devices ×U1'. For example, in the case that transfer data between the first and second query processing devices has the segment size V1 and transfer data between the second and third query processing devices has the segment size V2, the cost C1 can be calculated as follows: C1=V1× U1+V2×U1. Here, the communication cost U1 per size of the data unit between the query processing devices may be determined by considering the communication environment.

Next, the communication route searching unit 208 calculates a communication cost C2 in the case that the assigned segment arrives in the i-th query processing device through the j-th query processing device and the proxy device 2 (S2205). For example, assuming that the communication cost per size of the data unit between the query processing device and the proxy device is set to U2, in the case that transmitting data from the j-th query processing device to the proxy device 2 has the segment size V3 and receiving data in the i-th query processing device from the proxy device 2 has the segment size V4, the cost C2 is calculated as follows: C2=V3×U2+ V4×U2. The communication cost U2 per size of the data unit between the query processing device and the proxy device 2 is predetermined by considering communication environment and the processing cost which is necessary for management in the proxy device 2.

Next, the communication route searching unit 208 compares the communication cost C1 calculated in step S2204 with the communication cost C2 calculated in step S2205 (S2206). If the communication cost C1 is lower than the communication cost C2 (NO in step S2206), the communication route of the segment assigned in step S2203 is determined to a route passing through the first to the (i−1)-th query processing devices, and the process proceeds to step S2209. On the other hand, if the communication cost C2 is lower than the communication cost C1 (YES in step S2206), the communication route of the segment assigned in step S2203 is determined to a route passing through the first query processing device and the proxy device 2, and the process proceeds to step S2207.

In step S2207, the communication route searching unit 208 determines the segment to be the target of the local query allocated to the i-th query processing device assigned in step S2203 as the segment which configures the storage data. Thereafter, the communication route searching unit 208 accesses the i-th query processing device through the query processing device access unit 201, and sets the segment assigned in step S2203 to the segment which configures the target data of the query processing device concerned(S2208).

On the other hand, in step S2209, the communication route searching unit 208 separates the segment to be the target of the local query allocated to the i-th query processing device assigned in step S2203 from the segment which configures the storage data so as not to use proxy device.

Next, the communication route searching unit 208 checks if i=n (S2210). If i≠n (i does not arrive at n, that is, NO in step S2210), the value of i is incremented by one (S2211) and the process returns to step S2203. If i=n (YES in step S2210), the communication route searching unit 208 accesses the first query processing device through the query processing device access unit 201, and sets the segment which configures the storage data to the corresponding query processing device (S2212).

Figure 13:
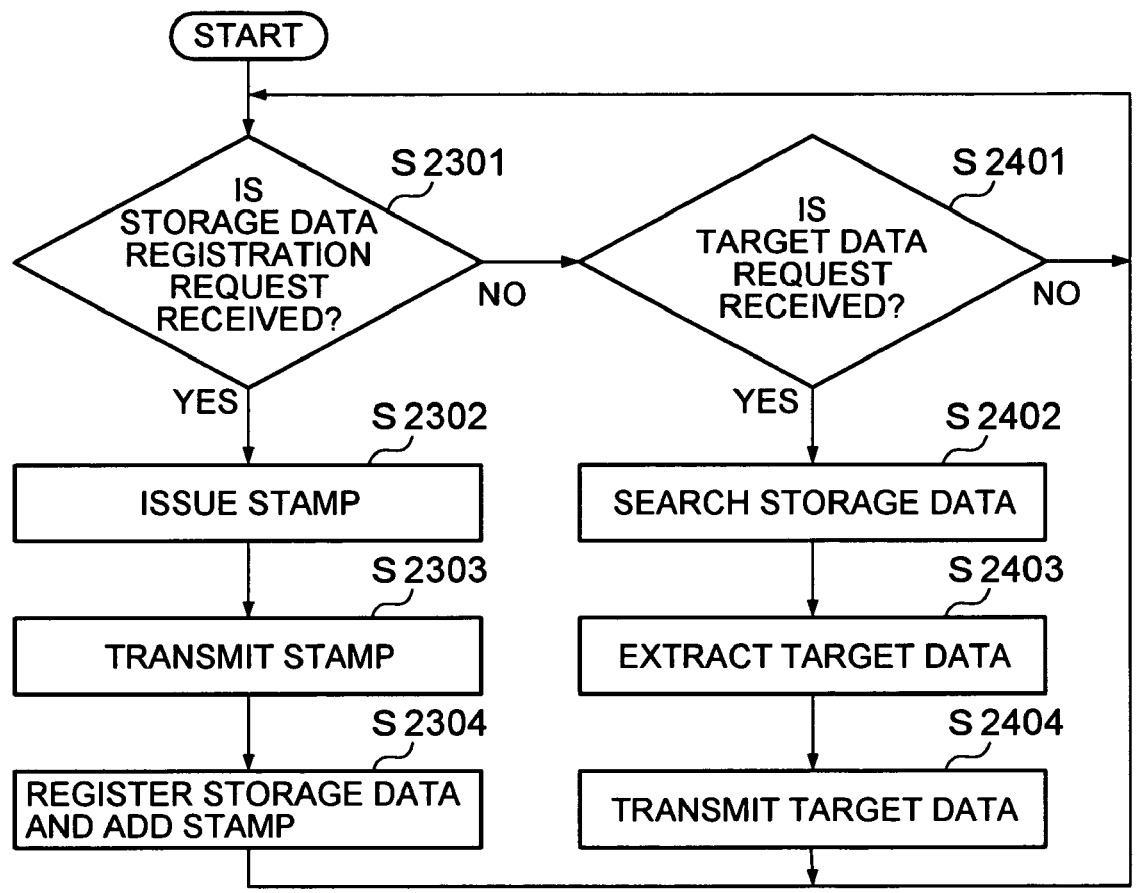
FIG. 13 is a flow chart illustrating a query processing operation of the proxy device 2.

FIG. 13 is a flow chart illustrating a query processing operation of the proxy device 2.

If the stamp issue unit 204 receives the storage data registration request from the first query processing device $1_1$ through the query processing device access unit 201 (YES in step S2301), the stamp issue unit 204 generates the system time stamp (for example, sequential number) 681 and the expire time stamp (for example, sequential number) 682 (S2302). Thereafter, the stamp issue unit 204 attaches the stream ID included in the storage data registration request concerned to the system time stamp 681 and the expire time stamp 682, and transmits the system time stamp 681 and the expire time stamp 682 to the first query processing device $1_1$ through the query processing device access unit 201 (S2303) In addition, the stamp issue unit 204 informs the stream ID included in the storage data registration request concerned and at least one segment to the storage data management unit 205 with the generated system time stamp 681 and the expire time stamp 682. When the storage data management unit 205 receives the stream ID, the at least one segment, the system time stamp 681, and the expire time stamp 682 from the stamp issue unit 204, the storage data management unit 205 registers the stream ID, the at least one segment, the system time stamp 681, and the expire time stamp 682 as the storage data (S2304).

In addition, if the data extracting unit 210 receives the target data request from the second to n-th query processing devices $1_2$ to $1_n$ through the query processing device access unit 201 (YES in step S2401), the data extracting unit 210 searches the storage data having the stream ID included in the target data request concerned from the storage data management unit 205 (S2402) and extracts data of the segment assigned in the target data request concerned from the searched storage data (S2403). Thereafter, the data extracting unit 210 transmits the extracted data of the segment, as the target data, to a transmission source of the target data request concerned through the query processing device access unit 201 (S2404).

Next, an operation overview of the stream data processing system according to the embodiment of the invention will be described.

Figure 14:
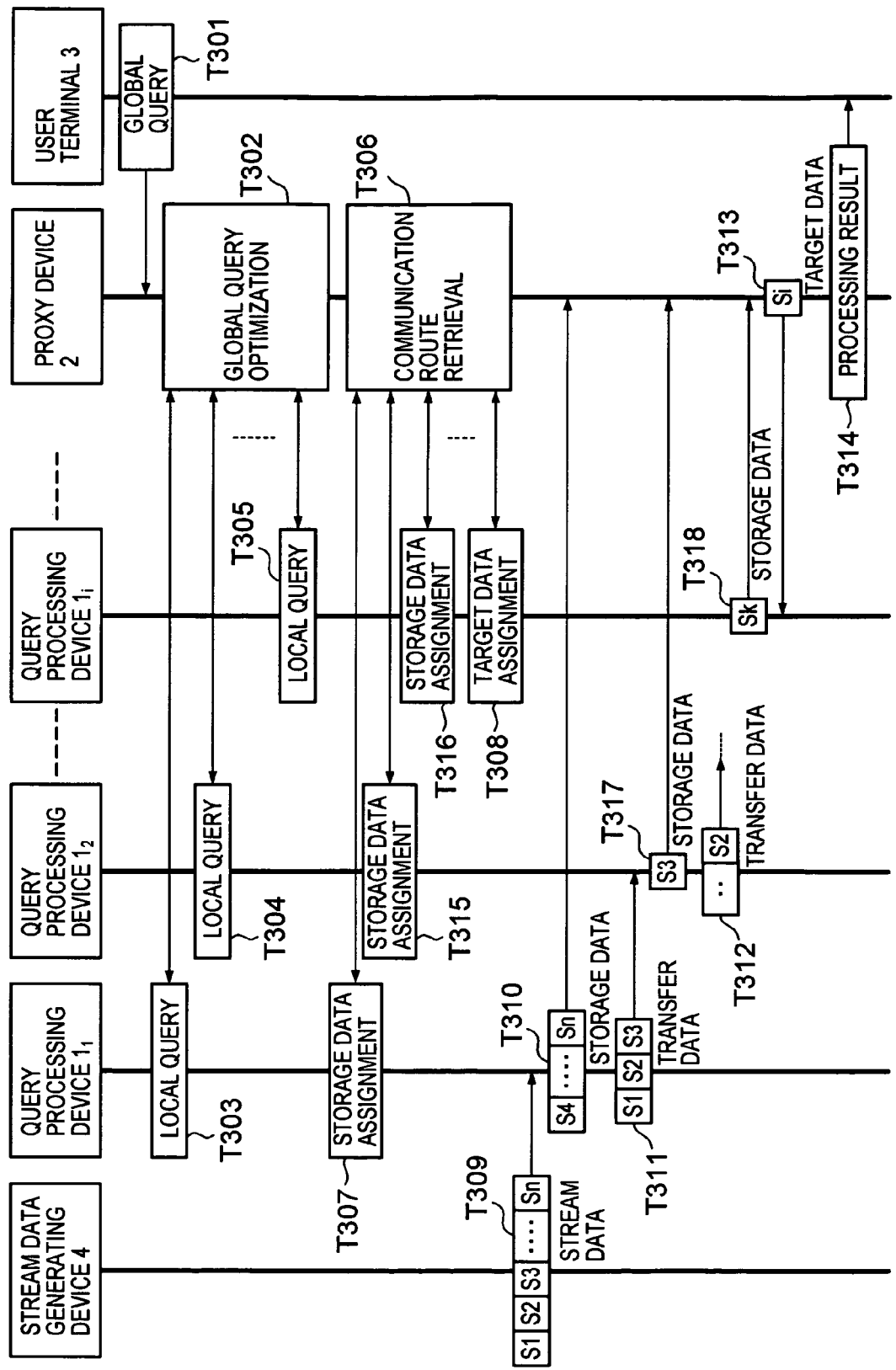
FIG. 14 is a view illustrating an operation of the stream data processing system shown in FIG. 1.

FIG. 14 is a view illustrating an operation of the stream data processing system shown in FIG. 1.

If the user terminal 3 transmits the global query to the proxy device 2 (T301), the proxy device 2 executes the above-described global query optimization processing (see FIG. 11) (T302) and sets the local queries to each query processing device $1_1$ to $1_n$ (T303 to T305). In addition, the proxy device 2 executes the above-described communication route retrieval processing (see FIG. 12) (T306) and sets the segment which configures the storage data to the i-th query processing device $1_i$ (where, $1 \leq i < n$) (T307, T315, and T316). In addition, the proxy device 2 sets the segments to be used as the target data in the query processing devices $1_2$ to $1_n$ which use the segment of the target data during the process (T308). Accordingly, various types of sets performed before the global query is executed are terminated.

The stream data generating device 4 generates the stream data including the plurality of segments S1 to Sn and transmits the stream data to the first query processing device $1_1$ (T309).

The i-th query processing device $1_i$ (where, $1 \leq i < n$) quarries the segments S4 to Sn which configure the storage data from the received stream data Sl to Sn according the set of the proxy device 2 and transmits the segments S4 to Sn to the proxy device 2 (T310). In addition, the query processing devices $1_1$ executes the local query with respect to the segments S1 to S3 included in the remaining stream data and transmits the execution result thereof, as the transfer data, to the second query processing device $1_2$ (T311).

The second query processing device $1_2$ executes the local query with respect to the segments S2 and S3 included in the transfer data, transmits the execution result thereof, as the transfer data, to the third query processing device $1_3$ (T312), and transmits the segment S3, as the storage data, to the proxy device 2 (T317). Here, the i-th query processing device $1_i$ also performs the same process (T318). However, if the segment Si to be the target of the local query is not included in the transfer data, the segment Si is obtained from the proxy device 2 (T313).

The n-th query processing device $1_n$ informs the processing result of the local query to the proxy device 2. The proxy device 2 transmits the received processing result to the user terminal 3 as the processing result of the global query (T314).

Hereinbefore, the embodiments of the invention have been described.

According to the above-described embodiments, for example, the segment which is first used by the rear query processing device in the process order for process of the local query, is stored in the proxy device 2 as the storage data. Accordingly, it is possible to prevent the segment concerned from being transferred among a plurality of query processing devices, whereby communication traffic can be restrained.

In addition, in this embodiment, since the query is processed according the order indicated by the system time stamp assigned in the process target data, it is possible to suitably process the stream data in which the processing order is important, such as a price trend on stocks. In addition, in this embodiment, since the process target data, in which the lifetime indicated by the expire time stamp expires, is deleted from the temporal storage in the device, it is possible to prevent the unnecessary data from existing in the device and affecting the query processing result.

It is also to be understood that the technical scope of the invention is not limited to the above-described embodiment, and various modification actions can be made to the embodiment without departing from the scope and sprit of the present invention.

For example, in the above-described embodiment, the last (n-th) query processing device $1_n$ transmits the processing result of the global query to the proxy device 2, but it is also preferable to directly transmit the processing result to the user terminal 3.

In addition, in the above-described embodiment, the sequential number is used as an example of the system time stamp 681 and the expire time stamp 682. However, the invention is not limited this, and, for example, time can be used as the system time stamp 681 and the expire time stamp 682.

In addition, any one of the query processing devices $1_1$ to $1_n$ may be used as the proxy device 2 by having a function of the proxy device 2 in the above-described embodiment.

What is claimed is:

1. A stream data processing system which executes a global query registered beforehand with respect to stream data and outputs an execution result thereof wherein the global query comprising n local queries and n is an integer, the stream data processing system comprising:

n query processing devices each of which is coupled to each other via a network, i-th query processing device executing i-th local query wherein said i is an integer and $1 \leq i \leq n$; and a proxy device which is coupled to the n query processing devices via a network and stores storage data including at least a part of the stream data, wherein the i-th query processing device includes:

a data receiving unit which receives the stream data in the case of i=1 and receives, via the network, data transferred from the (i−1)-th query processing device in the case of i≠1;

a data registration unit which stores storage data including at least a part of the received stream data in the proxy device in the case of $1 \leq i < n$;

a data obtaining unit which determines if storage data stored in the proxy device by another query processing device includes target data necessary for processing the i-th local query registered beforehand in the case of $1 < i \leq n$, and accesses, via the network, the proxy device so as to obtain the target data if the storage data stored in the proxy device by said another query processing device includes the target data;

a local query processing unit which executes the i-th local query registered beforehand with respect to the stream data received by the data receiving unit in the case of i=1, and executes the i-th local query registered beforehand with respect to the transfer data received by the data receiving unit and/or the target data obtained by the data obtaining unit in the case of i≠1; and a data transmission unit which transmits, via the network, a processing result of the local query processing unit, as the transfer data, to the (i+1)-th query processing device in the case of i≠n, and transmits, via the network, the processing result of the local query processing unit to a predetermined device in the case of i=n, and the proxy device includes:

a storage data storage unit which receives the storage data including at least a part of the stream data from each query processing device and stores the received storage data; and a data reading unit that reads the target data requested from each query processing device from the storage data stored in the storage data storage unit and transmits, via the network, the read target data to the query processing device which is a request source.

2. The stream data processing system according to claim 1, wherein the proxy device further includes:

a global query input unit which receives an input of the global query;

a local query generating unit which generates first to n-th local queries which configure the global query input to the global query input unit; and a local query transmission unit which transmits the first to n-th local queries generated by the local query generating unit to the first to n-th query processing devices, and the i-th (where, 1≦i≦n) query processing device further includes:

a query receiving unit which receives the i-th local query from the proxy device and sets the received i-th local query to the local query processing unit.

3. The stream data processing system according to claim 2, wherein the local query generating device generates the first to n-th local queries so as for the total sum of a processing cost to satisfy a predetermined condition when executing the first to n-th local queries in the local query processing unit of the first, to n-th query processing devices, respectively.

4. The stream data processing system according to claim 3, wherein the local query generating unit includes:

a generating unit which generates a plurality of groups of the first to n-th local queries with respect to the global query input to the global query input unit;

an execution unit which executes, for each of the first to n-th query processing devices, a process that transmits the i-th (where 1≦i≦n) local query of the each generated group to the i-th query processing device, and obtains a processing cost of the i-th local query of the each generated group from the query processing device concerned; and a selection unit which selects a group whose total sum of the processing cost of the first to n-th local queries is minimized, on the basis of the processing cost of the first to n-th local queries of the each group obtained from the first to n-th query processing devices, and wherein the local query transmission unit transmits the first to n-th local queries of the group selected by the selection unit to the first to n-th query processing device, respectively.

5. The stream data processing system according to claim 2, wherein the proxy device further includes a storage data requesting unit which transmits, to the i-th (where 1≦i≦n) query processing device, an assignment of a part, which is to be stored as the storage data in the storage data storage unit, among the stream data input to the i-th query processing device concerned, and the data registration unit extracts the part assigned by the proxy device from the stream data received by the data receiving unit and stores storage data which includes the extracted part concerned.

6. The stream data processing system according to claim 5, wherein the proxy device further includes a storage data determining unit which determines a part, which is to be stored as the storage data in the storage data storage unit, among the stream data so that the total sum of communication costs for obtaining the target data, which is necessary to execute the i-th (where, 1≦i≦n) local query generated by the local query generating unit in the i-th query processing device, from the stream data concerned input to a j-th (where, 1≦j<i) query processing device, can satisfy the predetermined condition.

7. The stream data processing system according to claim 6, wherein the storage data determining unit executes, for the first to n-th query processing devices, a process which compares a first communication cost when obtaining the target data, in which the i-th (where 2≦i<n) query processing device needs so as to execute the i-th local query, from the stream data through the j-th (where, 1≦j<i) query processing device with a second communication cost when obtaining the target data from the stream data through the proxy device, and determines the target data, as the storage data which is a part to be stored in the storage data storage unit when the second communication cost is less than the first communication cost.

8. The stream data processing system according to claim 1, wherein the proxy device further includes a system time stamp generating unit which generates a system time stamp, which indicates an input order of the stream data input to the first query processing device, in response to a system time stamp request from the first query processing device, and transmits the generated system time stamp to the first query processing device concerned, the data receiving unit of the first query processing device transmits the system time stamp request to the proxy device whenever newly receiving stream data, obtains the system time stamp from the proxy device, and assigns the obtained system time to newly received stream data, the local query processing unit of the i-th (where 1≦i≦n) query processing device executes the i-th local query with respect to a part of the corresponding stream data according to the order indicated by the system time stamp assigned to the stream data in the case of i=1, and executes the i-th local query with respect to the corresponding transmission data and/or the target data according to the order indicated by the system time stamp assigned to the transmission data in the case of i≠1, and the data transmission unit of the i-th (where $1 \leq i \leq n$) query processing device assigns the system time stamp assigned to the stream data received by the data receiving unit to the transmission data which is the processing result of the local query processing unit and transmits the transmission data to the second query processing device in the case of i=1, and assigns the system time stamp assigned to the transmission data received by the data receiving unit to the transmission data which is the processing result of the local query processing unit and transmits the transmission data to an (i+1)-th query processing device in the case of i≠1,n.

9. The stream data processing system according to claim 8, wherein the proxy device further includes an expire time stamp generating unit which generates an expire time stamp which indicates a lifetime of the stream data, in which the system time stamp generated by the system time stamp generating unit is assigned, in the stream data processing system, and the i-th (where, $1 \leq i \leq n$) query processing device further includes:

an obtaining unit which obtains an expire time stamp, which corresponds to the system time stamp assigned to the stream data received by the data receiving unit, from the proxy device in the case of i=1; and a delete unit which deletes corresponding stream data which exists in the corresponding query processing device and includes an expire time stamp older than the system time stamp of the stream data determined as a current process target in the corresponding query processing device in the case of $2 \leq i \leq n$.

10. The stream data processing system according to claim 1, wherein the storage data storage unit includes a main storage device and an auxiliary storage device.

11. The stream data processing system according to claim 1, wherein the predetermined device is the proxy device.

12. A stream data processing method of causing a stream data processing system, which includes n query processing devices each of which executes an i-th local query wherein said i is an integer and $1 \leq i \leq n$ and a proxy device which stores storage data including at least a part of the stream data, to perform:

executing a global query with respect to stream data, the global query comprising n local queries; and outputting an execution result thereof, wherein the i-th query processing device performs the steps of:

receiving the stream data in the case of i=1 and receiving, via a network, data transferred from an (i−1)-th query processing device in the case of i≠1;

transmitting, via the network, storage data including at least a part of the received stream data to the proxy device in the case of $1 \leq i < n$;

determining if storage data stored in the proxy device by another query processing device includes target data necessary for processing the i-th local query registered beforehand in the case of $1 < i \leq n$;

accessing, via the network, the proxy device so as to obtain target data if the storage data stored in the proxy device by another query processing device includes the target data necessary for processing the i-th local query registered beforehand in the case of $1 < i \leq n$;

executing the i-th local query registered beforehand with respect to the received stream data in the case of i=1, and executing an i-th local query registered beforehand with respect to the received transfer data and the obtained target data in the case of i≠1; and transmitting, via the network, an execution result of the local query, as transfer data, to an (i+1)-th query processing device in the case of i≠n, and transmitting the execution result of the local query to a predetermined device in the case of i+n, and wherein the proxy device performs the steps of:

receiving, via the network, the storage data including at least a part of the stream data from each query processing device and storing the received storage data; and reading target data requested by each query processing device from the stored storage data and transmitting the read target data, via the network, to the query processing device which is a request source.

* * * * *

UNITED STATES PATENT AND TRADEMARK OFFICE
CERTIFICATE OF CORRECTION

PATENT NO. : 7,644,110 B2 Page 1 of 1
APPLICATION NO. : 11/359540
DATED : January 5, 2010
INVENTOR(S) : Nishizawa et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 392 days.

Signed and Sealed this

Sixteenth Day of November, 2010

David J. Kappos
*Director of the United States Patent and Trademark Office*